United States Patent [19]

Ishiguro

[11] Patent Number: 5,264,891
[45] Date of Patent: Nov. 23, 1993

[54] RANGE FINDER FOR PASSIVE-TYPE AUTOFOCUSING DEVICE

[75] Inventor: Minoru Ishiguro, Ohmiya, Japan

[73] Assignee: Fuji Photo Optical Co., Ltd., Ohmiya, Japan

[21] Appl. No.: 43,830

[22] Filed: Apr. 6, 1993

Related U.S. Application Data

[63] Continuation-in-part of Ser. No. 834,636, Feb. 12, 1992.

[30] Foreign Application Priority Data

Apr. 7, 1992 [JP] Japan ................. 4-114125

[51] Int. Cl.⁵ .................................. G03B 3/00
[52] U.S. Cl. ....................... 354/402; 250/201.6
[58] Field of Search ............... 354/402, 403, 406, 407, 354/408; 250/201.6

[56] References Cited

U.S. PATENT DOCUMENTS 4,387,975 6/1983 Araki ................................ 354/408
5,189,461 2/1993 Ishiguro ........................... 354/402

Primary Examiner—Michael L. Gellner
Assistant Examiner—Jae N. Noh
Attorney, Agent, or Firm—Price, Heneveld, Cooper, DeWitt & Litton

[57] ABSTRACT

A range finder for an autofocusing device includes three photosensors or a photosensor including three section. An output signal from the line sensor representing a luminance distribution of the scene is A/D converted. A secondary difference of the output signal from the line sensor thus A/D converted is interpolated to compute and detect a zero-cross point. The zero-cross data obtained in this manner are stored, each in the form of interpolated zero-cross location data and polarity data within a single pixel. The zero-cross behavior signals obtained from two of the photosensors are successively shifted relative to the zero-cross behavior signal obtained from the other photosensor until a coincidence of the zero-cross location data and the polarity data of the three photosensors is detected. A range to the scene is computed from a total amount of shifting at the moment of the coincidence.

4 Claims, 17 Drawing Sheets

Fig. 13

| | | | | | | | | | | | | |
|---|---|---|---|---|---|---|---|---|---|---|---|---|
| COUNTER3=3 | | | -1 | 0 | 1 | 2 | 3 | 4 | 5 | 6 | | |
| COUNTER3=2 | | | -2 | -1 | 0 | 1 | 2 | 3 | 4 | 5 | | |
| COUNTER3=1 | | | -3 | -2 | -1 | 0 | 1 | 2 | 3 | 4 | | |
| COUNTER3=0 | | | -4 | -3 | -2 | -1 | 0 | 1 | 2 | 3 | | |

LEFT: -4 -3 -2 -1 | 0 1 2 3 | 4 5 6 7
L(n-1)    L(n)    L(n+1)

CENTER: C(n) = 0 1 2 3

RIGHT: R(n-2) = -4 -3 -2 -1 | R(n-1) = 0 1 2 3 | R(n) = 4 5 6 7

| | | | | | | | | |
|---|---|---|---|---|---|---|---|---|
| COUNTER3=0 | 0 | 1 | 2 | 3 | 4 | 5 | 6 | 7 |
| COUNTER3=1 | -1 | 0 | 1 | 2 | 3 | 4 | 5 | 6 |
| COUNTER3=2 | -2 | -1 | 0 | 1 | 2 | 3 | 4 | 5 |
| COUNTER3=3 | -3 | -2 | -1 | 0 | 1 | 2 | 3 | 4 |

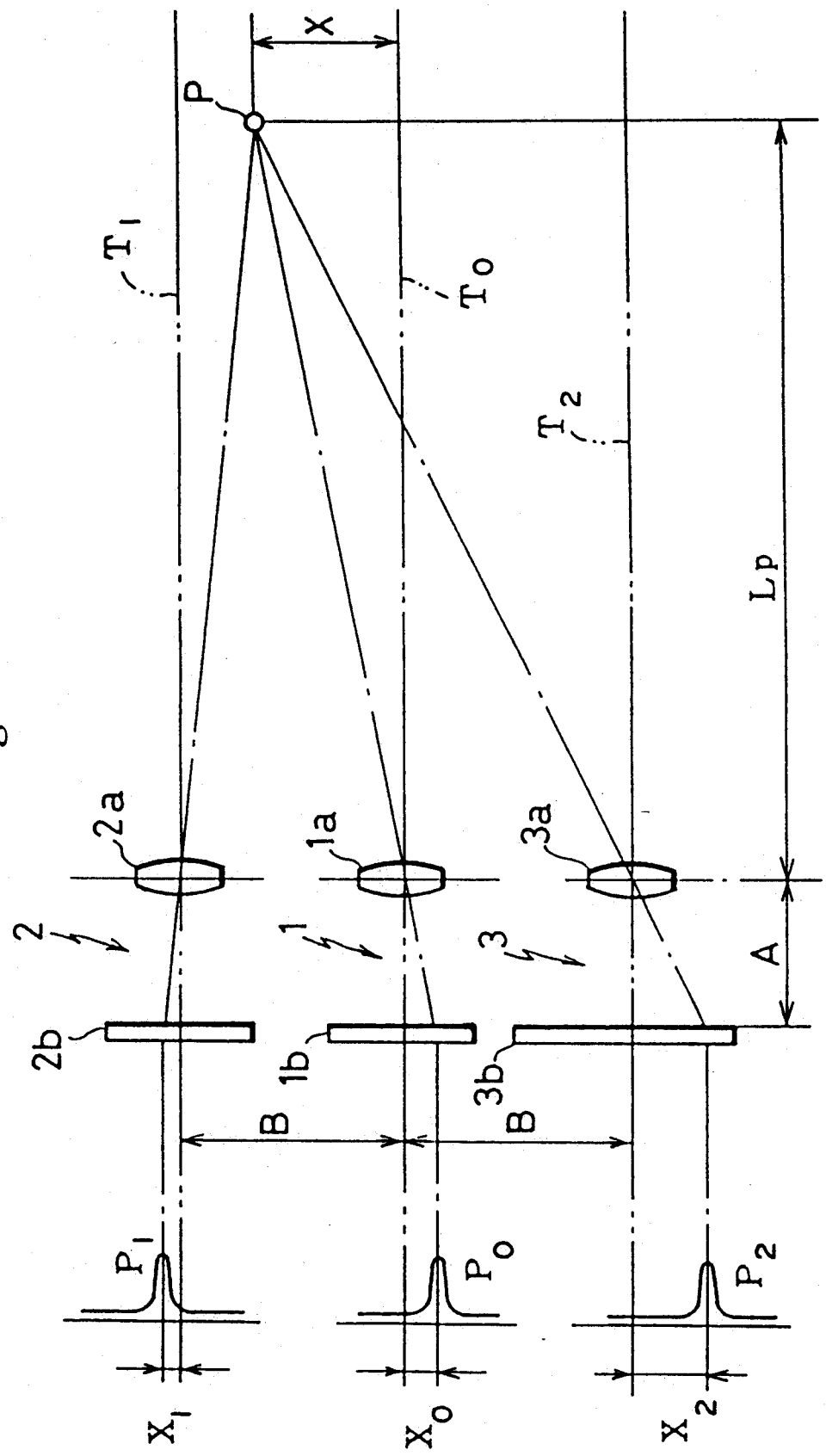

RANGE FINDER FOR PASSIVE-TYPE AUTOFOCUSING DEVICE

CROSS REFERENCE TO RELATED APPLICATION

This application is a continuation-in-part of U.S. patent application Ser. No. 07/834,636, filed Feb. 12, 1992, and entitled RANGE FINDER FOR PASSIVE TYPE AUTO FOCUSING DEVICE, the disclosure of which is incorporated herein by reference. This application is related to U.S. Pat. No. 5,189,461, entitled RANGE FINDER FOR PASSIVE TYPE AUTOFOCUSING DEVICE, issued on Feb. 23, 1993; U.S. patent application Ser. No. 07/959,665 entitled RANGE FINDER FOR PASSIVE TYPE AUTOFOCUSING DEVICE, filed on Oct. 8, 1992; and U.S. patent application Ser. No. 07/961,554 entitled RANGE FINDER FOR PASSIVE TYPE AUTOFOCUSING DEVICE, filed on Oct. 15, 1992.

BACKGROUND OF THE INVENTION

1. Technical Field

This invention relates to a range finder for a passive type autofocusing device so arranged that light rays emitted from a scene to be photographed are picked up to find a range to the scene a the objective is adjustably brought into focus based on the result of the range finding.

2. Prior Art

The autofocusing device is used to find a shooting range for a photographic camera or the like in automatic mode and to bring the objective into focus based on a result of the range finding and such autofocusing device allows everyone to enjoy photographing easily. Various types of autofocusing devices have already been developed and most of them employ the trigonometrical range finding method. A typical autofocusing device relying on this trigonometrical range finding method is so-called passive-type autofocusing device adapted to pick up light rays emitted from the scene by photosensors provided on the camera and thereby to find a shooting range.

Some of the passive-type autofocusing devices include a pair of photosensors. However, if the scene includes two objects being in contrast with each other, such range finder provided with a pair of photosensors disadvantageously indicates two different states of the single scene to be photographed and consequently cannot achieve reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No.1989-177382, Japanese Patent Application Disclosure No.1991-42642). A principle of range finding by this range finding mechanism will be described in reference with FIGS. 18 and 19 of the attached drawing. The range finding mechanism comprises a reference photosensor 1, a first photosensor 2 and a second photosensor 3. These photosensors 1, 2, 3 comprise, in turn, imaging lenses 1a, 2a, 3a and photodetector arrays 1b, 2b, 3b, respectively, so that a scene to be photographed is imaged through the imaging lenses 1a, 2a, 3a on the photodetector arrays 1b, 2b, 3b, respectively. FIG. 18 illustrates a case in which the scene P comprises a single object. Now, referring to FIG. 18, $x_0$ represents a displacement of an output signal $P_0$ relating to a luminance distribution on the object P detected by the reference photodetector array 1b with respect to an optical axis $T_0$ of the reference photosensor 1, x, represents a displacement of an output signal $P_1$ relating to a luminance distribution on the object P detected by the first photodetector array 2b with respect to an optical axis $T_1$ of the first photosensor 2, and $x_2$ represents a displacement of an output signal $P_2$ relating to a luminance distribution on the object P detected by the second photodetector array 3b with respect to an optical axis $T_2$ of the second photosensor 3. These displacements $x_0$, $x_1$, $x_2$ represents phase differences relating to the luminance distribution on the object detected by the photodetector arrays 1b, 2b, 3b, respectively. Assume that the optical axes $T_0$, $T_1$, $T_2$ are spaced from one another by distance B, photodetective surfaces of the photodetector arrays 1b, 2b, 3b are spaced from the respective imaging lenses 1a, 2a, 3a by distance A, and the object P lies at a distance Lp from the imaging lenses 1a, 2a, 3a and at a distance X from the optical axis $T_0$, the following equation is derived from the principle of trigonometrical survey:

$$X = x_0 \cdot Lp/A \tag{1}$$

If a direction in which the output signal image appears with respect to the optical axis $T_0$ is taken into account, $$-x_1 = (B-X)/Lp \cdot A \tag{2}$$

$$x_2 = (B+X)/Lp \cdot A \tag{3}$$

If the equation (1) is substituted for these equations (2), (3), respectively, $$x_1 = (B/Lp) \cdot A + x_0 \tag{4}$$

$$x_2 = (B/Lp) \cdot A + x_0 \tag{5}$$

Comparison of the equations (4) and (5) indicates that $x_1$ and $x_2$ are displaced with respect to a reference $x_0$, respectively, by an amount $$(B/Lp) \cdot A = Xp \tag{6}$$

Accordingly, this Xp may be obtained to compute $$Lp = A \cdot B/Xp \tag{7}$$

The procedure used to obtain the Xp will be explained in reference with FIG. 19. FIG. 19(a) illustrates output signals relating to the luminance distribution detected by the photodetector arrays 1b, 2b, 3b exposed to light rays emitted from two objects with respect to reference output signals $P_0$, $Q_0$. From the state of FIG. 19(a) to the state of FIG. 19(b), the output signal waveforms $P_1$, $P_2$ may be shifted with respect to the output waveform $P_0$ until these output signal waveforms $P_0$, $P_1$, $P_2$ coincide with one another to obtain an amount of the displacement Xp. More specifically, at this moment of coincidence, $P_1$ and $P_2$ have been displaced by an equal amount. Accordingly, when the three output signal waveforms coincide with one another after the output signal of the photodetector array 2b and the output signal of the photodetector array 3b have been shifted by an equal amount, as seen in FIG. 19(a) the waveforms of these output signals will provide the data relating to the same object P. Next, as illustrated by FIG. 19(c), the output signal $Q_1$, $Q_2$ may be shifted with respect to the output signal $Q_0$ until the output signal $Q_1$, $Q_2$ coincide with the output signal $Q_0$ to obtain an amount of the displacement Xq.

Based on the Xp, Xq obtained in the manner as has been described above, the ranges Lp, Lq to the objects P, Q, respectively, are computed according to the equation (7).

Accordingly, it is a principal object of the invention to provide a range finder so improved that signal processing can be achieved at a higher computing speed, surprisingly distinct picture can be obtained and the number of parts can be minimized.

SUMMARY OF THE INVENTION

The objective set forth above is achieved, according to the invention, by a range finder for a passive type autofocussing device. The range finder comprises three photosensors consisting of a single line sensor divided into three sections and three imaging lenses associated with the respective line sensor sections to pick up a luminance distribution of a scene to be photographed a single secondary difference computing circuit is adapted for A/D converting an output signal from the line sensor and then computing a secondary difference of the digital value a single zero-cross detecting circuit interpolates an output signal from the secondary difference computing circuit and derives polarity data by distinctly detecting a positive-to-negative zero-cross point and a negative-to-positive Zero-cross point of the output signal, zero-cross memory circuits store, in association with those three photosensors, respectively, interpolated zero-cross location data within a single pixel of the line sensor together with polarity data obtained on the basis of the zero -cross behavior signals output from the zero-cross detecting circuit a coincidence detecting circuit compares the zero-cross location data and the polarity data stored in the respective zero-cross memory circuits and detects a coincidence thereof, one of those three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

According to another aspect of the invention, there is provided a range finder comprising three line sensors, secondary difference computing circuits associated with these three line sensors, and zero-cross detecting circuits associated with the respective secondary difference computing circuit wherein the respective zero-cross detecting circuits perform interpolative computation and zero-cross detection.

An output voltage corresponding to the luminance distribution of the scene to be photographed is provided from a photodetector array constituting the photosensor. A secondary difference distribution of this output voltage is computed. The difference distribution is used to derive behavior signals. Zero-cross points of the behavior signals are detected, in association with the three line sensors or line sensor sections, with respect to a same area of the scene. The zero-cross behavior signals are shifted relative to the remaining behavior signal to bring the signals into coincidence.

An amount of shifting is obtained by the coincidence detecting circuit in which zero-cross location data and polarity data of those two zero-cross behavior signals are shifted until the coincidence is detected.

A range to the scene can be trigonometrically calculated from this amount of shifting.

These and other features, objects and advantages of the present invention will become apparent upon reading the following description thereof together with reference to the accompanying drawings, in which

BRIEF DESCRIPTION OF THE DRAWINGS

FIG. 13 is a conceptional diagram illustrating the procedure executed in Embodiment 1 to detect a coincidence in the data stored in the zero-cross memory circuits;

Figure 14A:
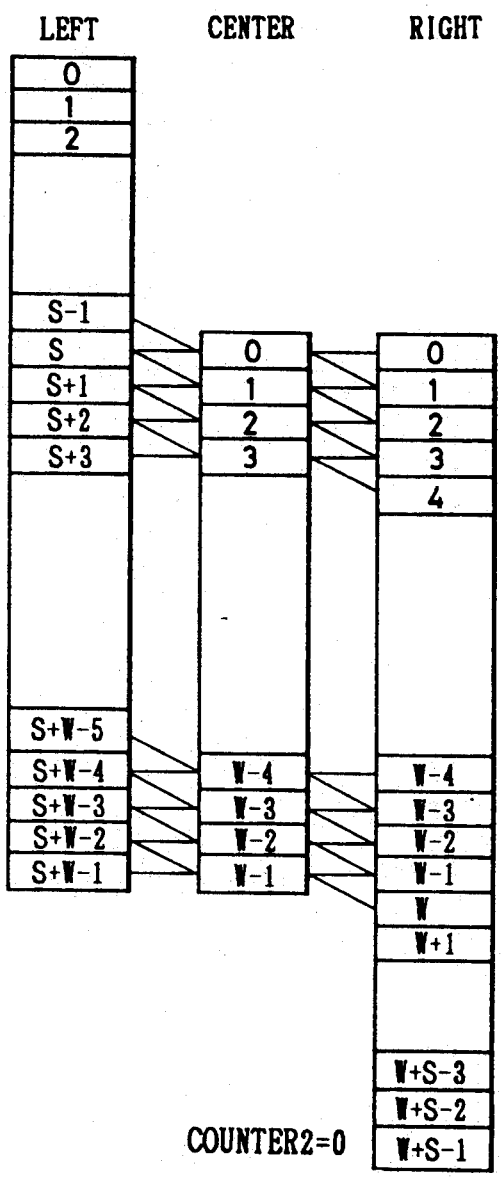
Figure 14B:
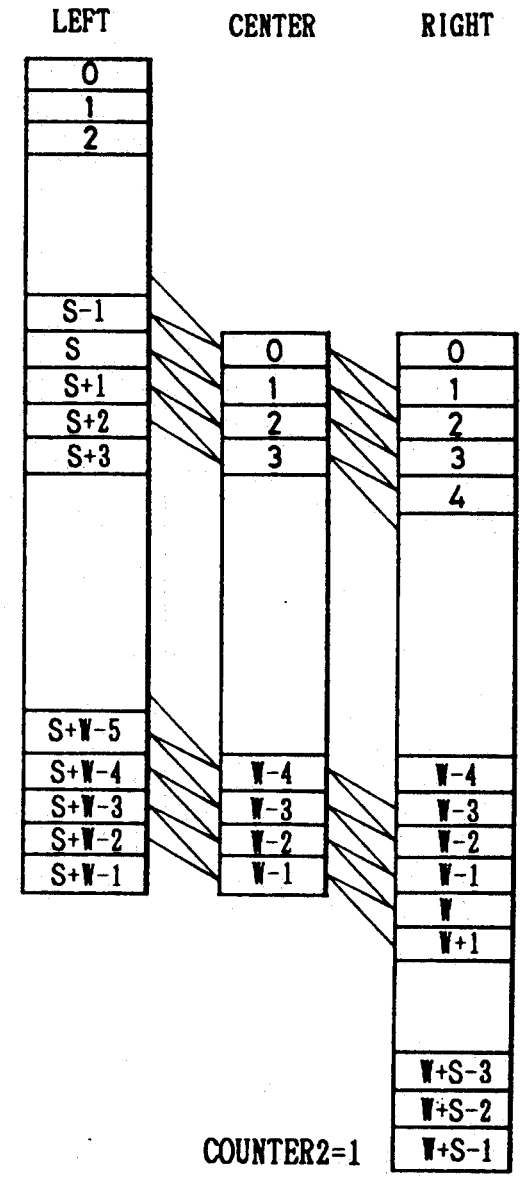
Figure 15:
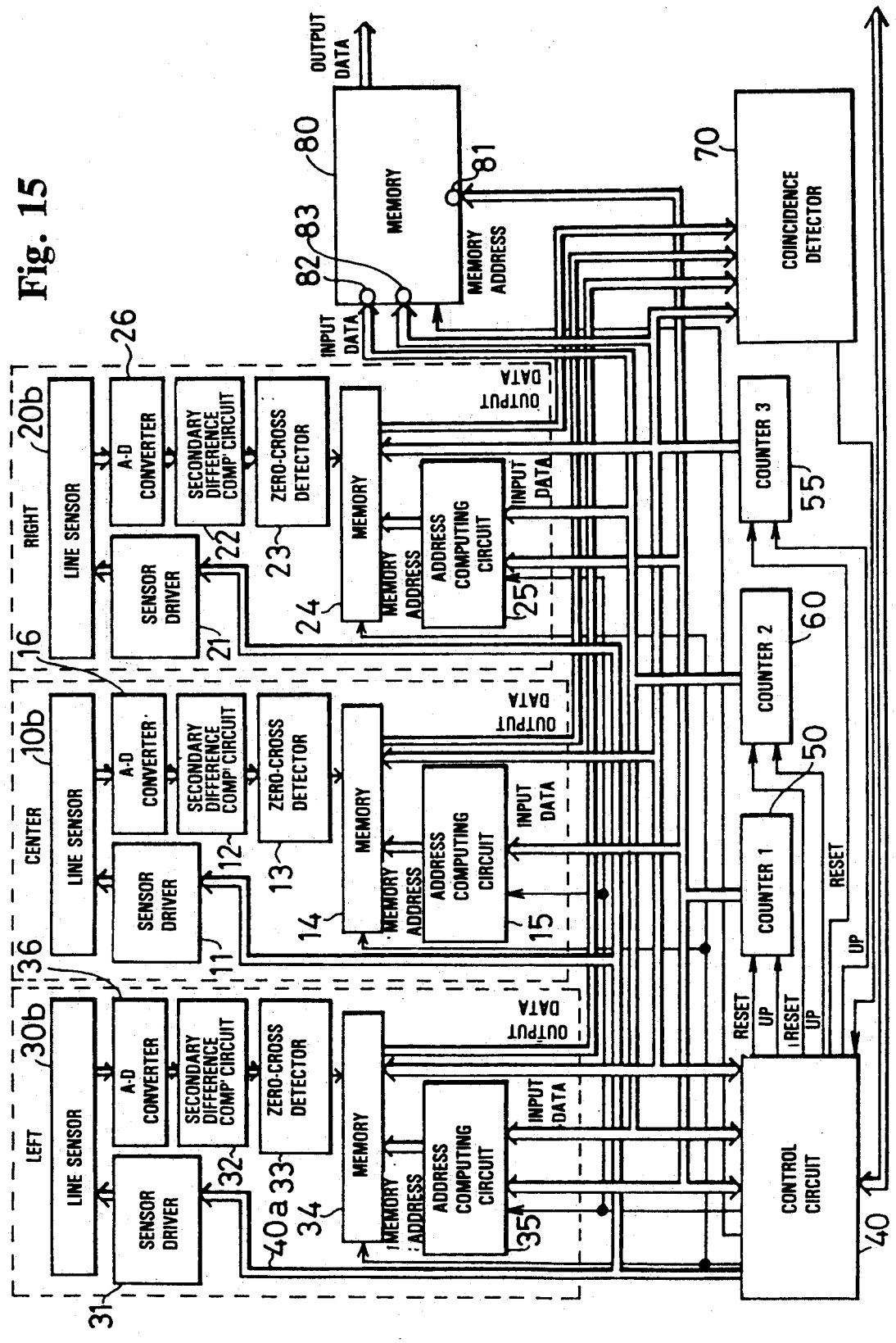
Figure 16:
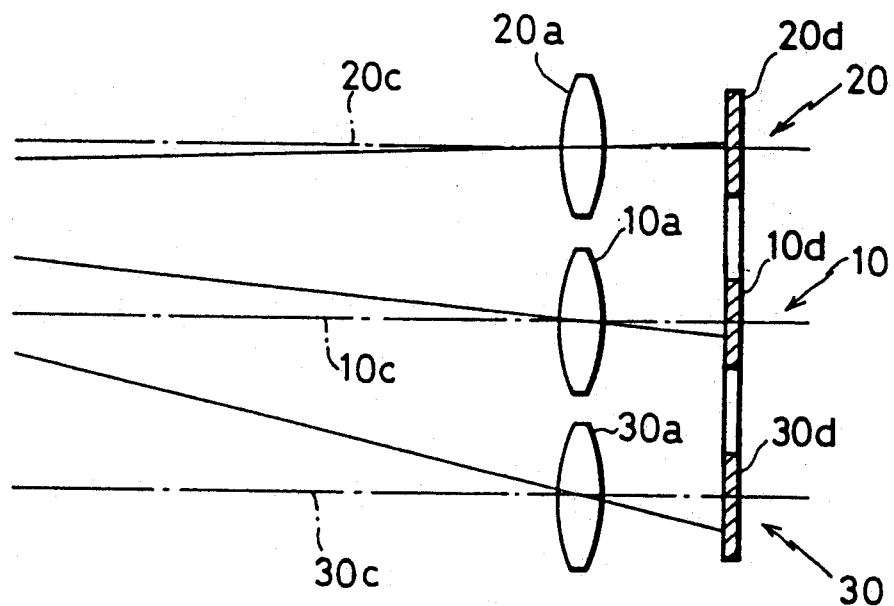
Figure 17:
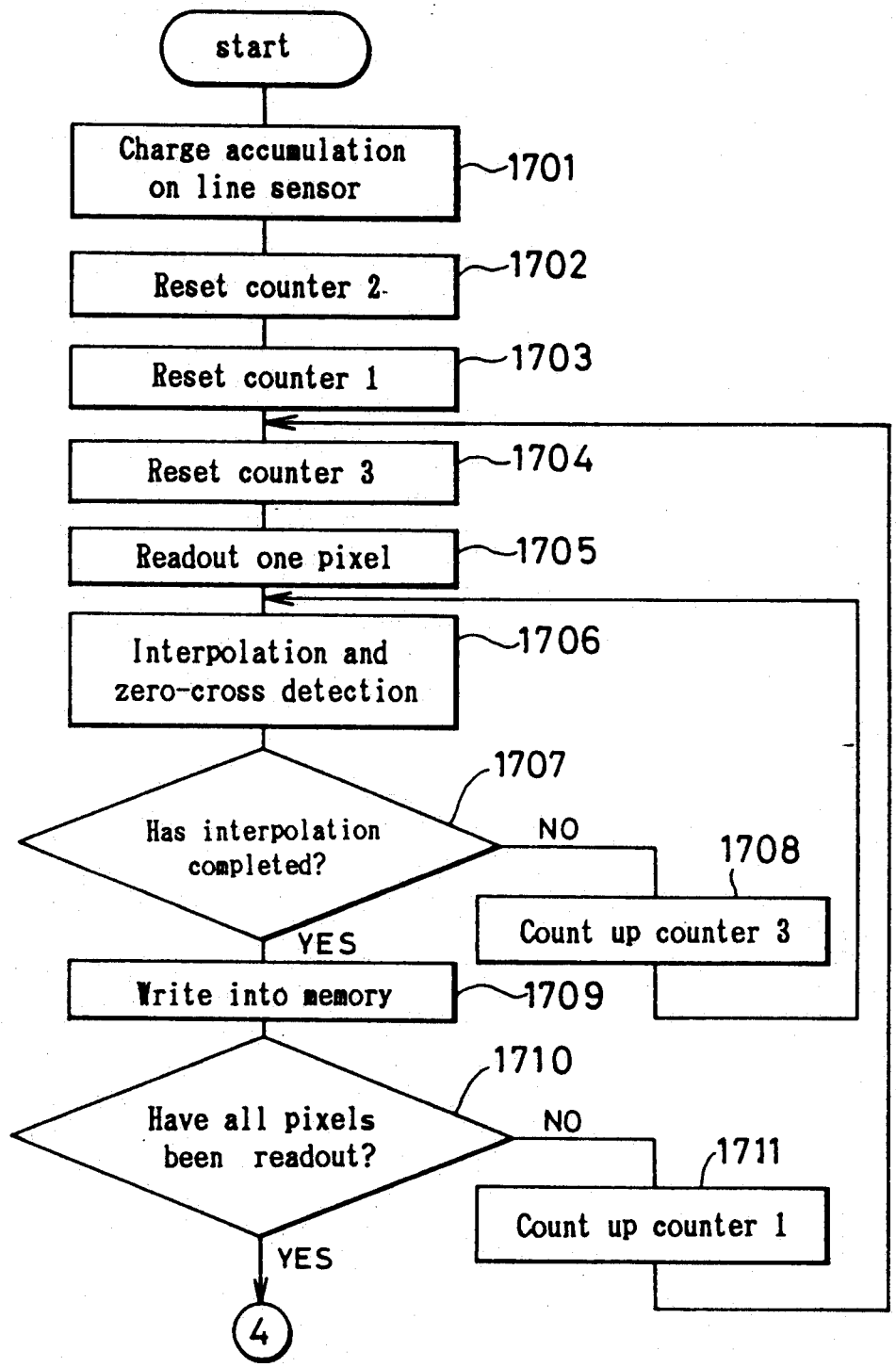
Figure 19A:
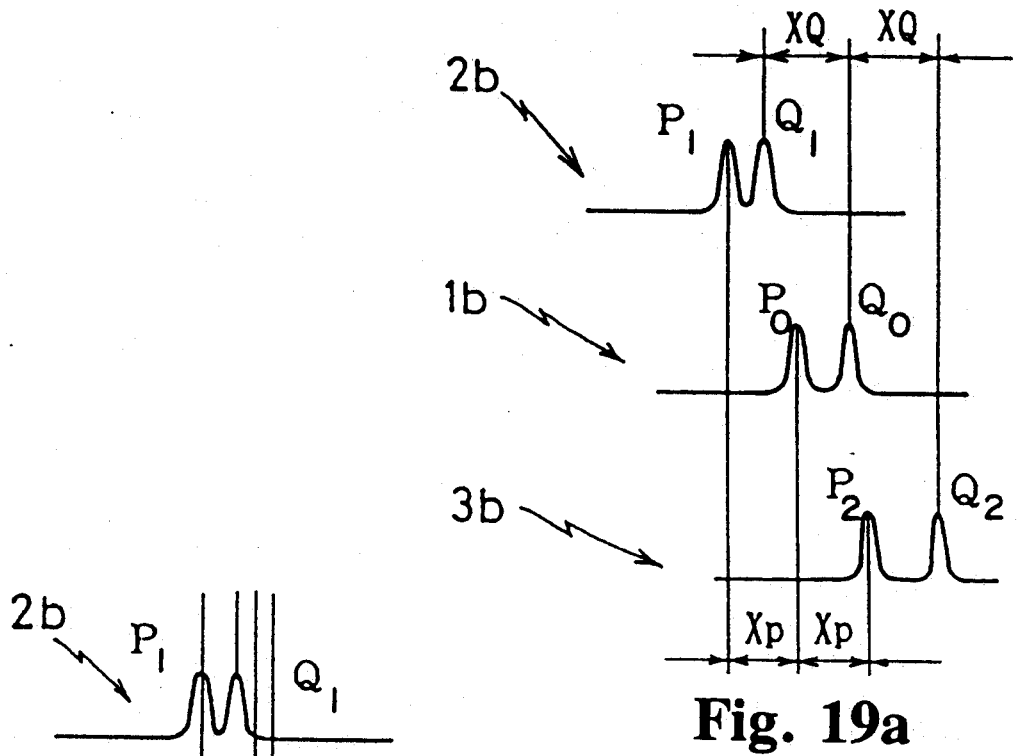
Figure 19B:
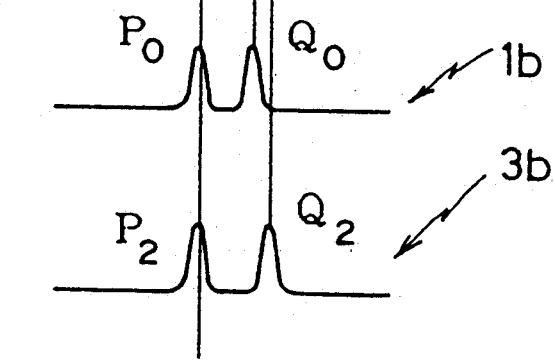
Figure 19C:
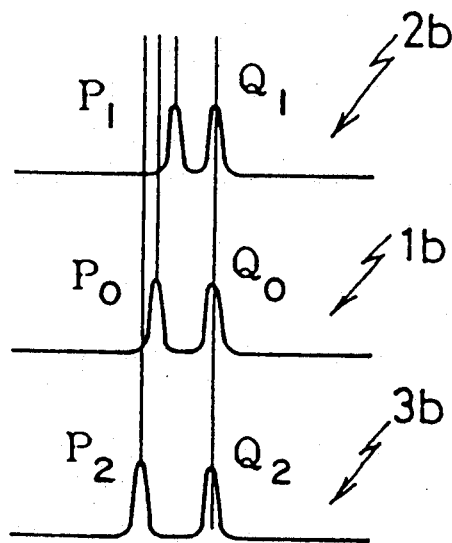

(a) and FIG. 14(b) are a diagram illustrating the procedure executed in Embodiment 1 to read and compare the data stored in the zero-cross memory circuits;

FIG. 15 is a circuit block diagram showing Embodiment 2 of the range finder for passive-type autofocusing device constructed in accordance with the invention;

FIG. 16 is a side view schematically showing the arrangement of the photosensors in Embodiment 2;

FIG. 17 is a flow chart of the program routine executed in Embodiment 2 to write the data obtained from the line sensor;

FIG. 18 is an optical path diagram illustrating a principle of range finding; and FIG. 19 is a signal diagram based on the luminance distribution of the scene detected by the photodetector arrays according to the principle of range finding.

Detailed Description of the Invention

The range finder for autofocusing device of the invention will be described more specifically in reference to the attached drawings. It should be understood that FIGS. 1 through 14 illustrate Embodiment 1 and FIGS. 15 through 17 illustrate Embodiment 2.

Embodiment 1

Figure 2:
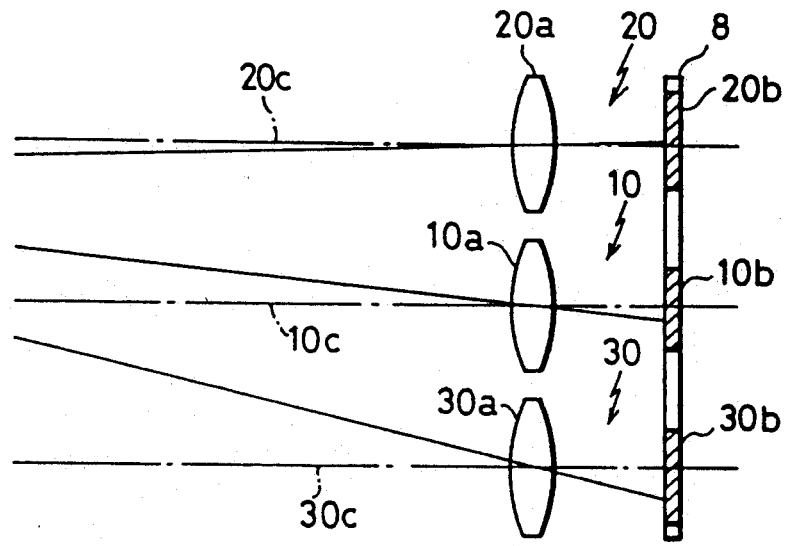
FIG. 2 is a side view schematically showing the arrangement of the photosensors in Embodiment 1.

Photosensors 10, 20, 30 comprise a single line sensor which comprises, in turn, a photodetector array composed from an appropriate number of pixels arranged side by side, and three imaging lenses combined with the line sensor. Referring to FIG. 2, there are provided on the front side of the photographic camera those three imaging lenses 10a, 20a, 30a so that light rays emitted from a scene to be photographed pass through these lenses 10a, 20a, 30a and the scene is imaged on respective portions of the single line sensor 8 placed behind the respective imaging lenses 10a, 20a, 30a. Thus, the line sensor 8 is actually divided into three sections, i.e., a central line sensor section 10b, a right side line sensor section 20b and a left side line sensor section 30b. Correspondingly, photosensors 10, 20, 30 are designated herein as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10.

Figure 1:
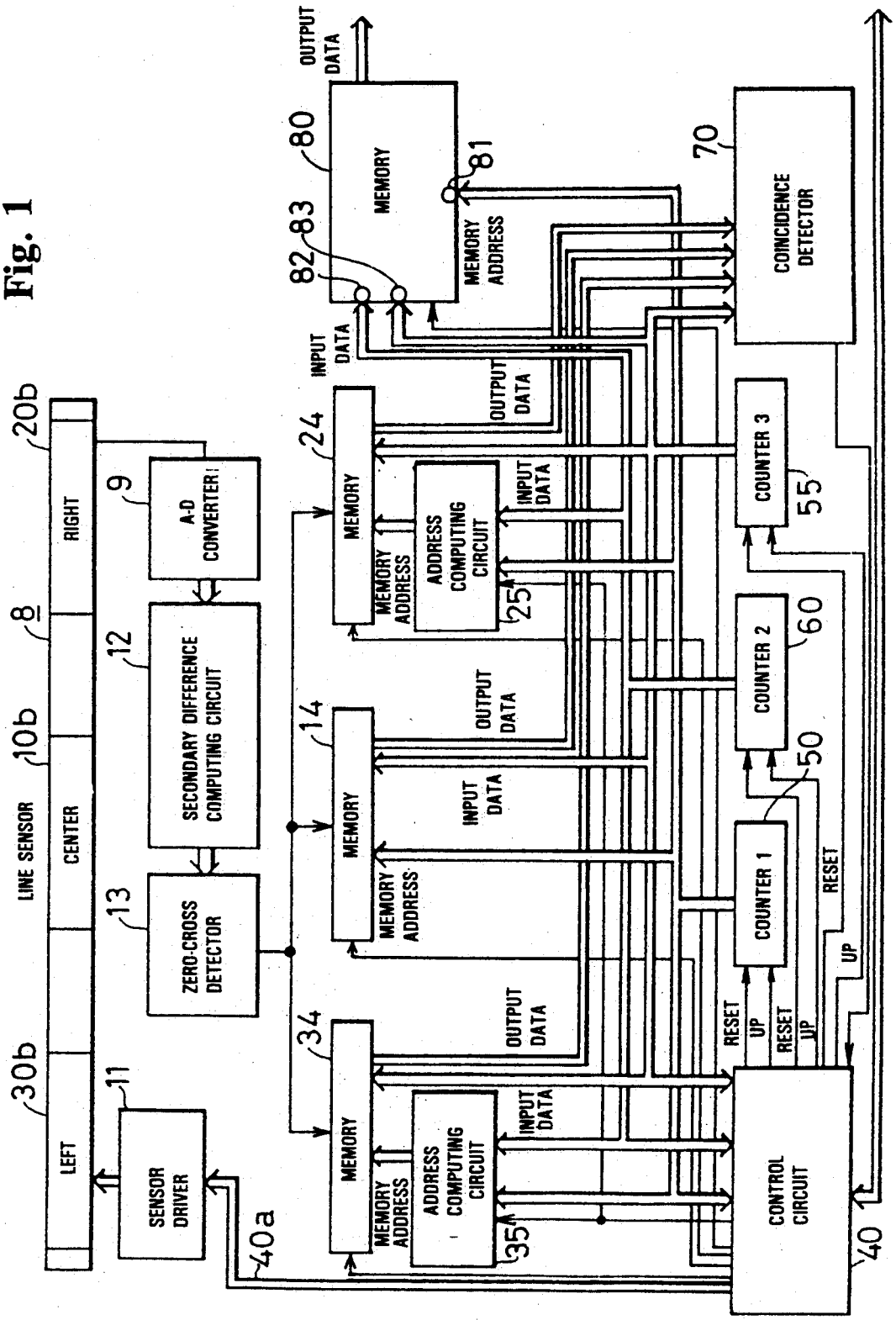
FIG. 1 is a circuit block diagram showing Embodiment 1 of the range finder for a passive type autofocusing device constructed in accordance with the invention.

Referring to FIG. 1, the line sensor 8 is applied with a driver signal from a sensor driver 11 and begins to pick up the light rays coming from the scene to be photographed on the basis of the driver signal. The sensor driver 11 is connected to a control circuit 40 via a drive control signal link 40a and controlled by a drive control signal provided from the control circuit 40.

Figure 3:
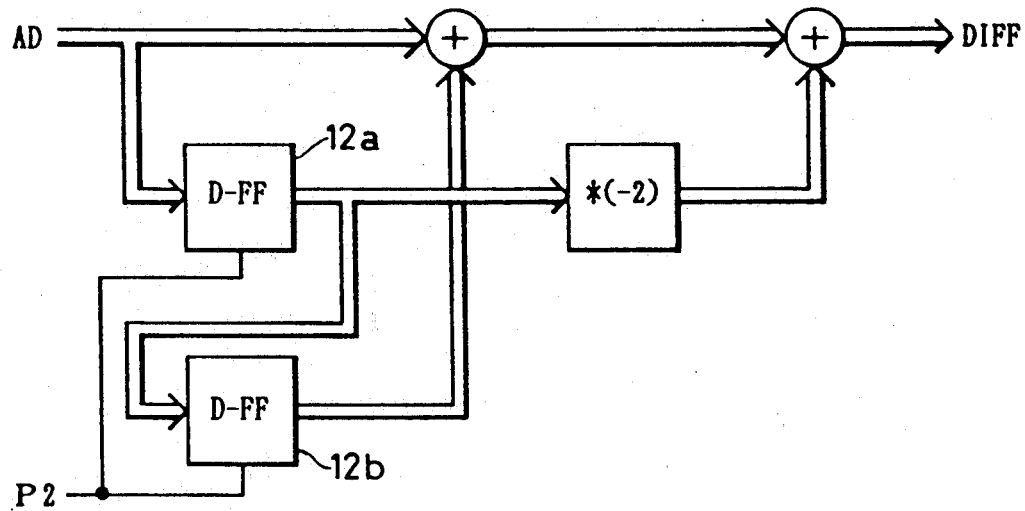
FIG. 3 is a circuit block diagram of the secondary difference computing circuit used in Embodiment 1 to A/D convert the output of the line sensor and to compute the secondary difference thereof by digitally processing the converted output.
Figure 4:
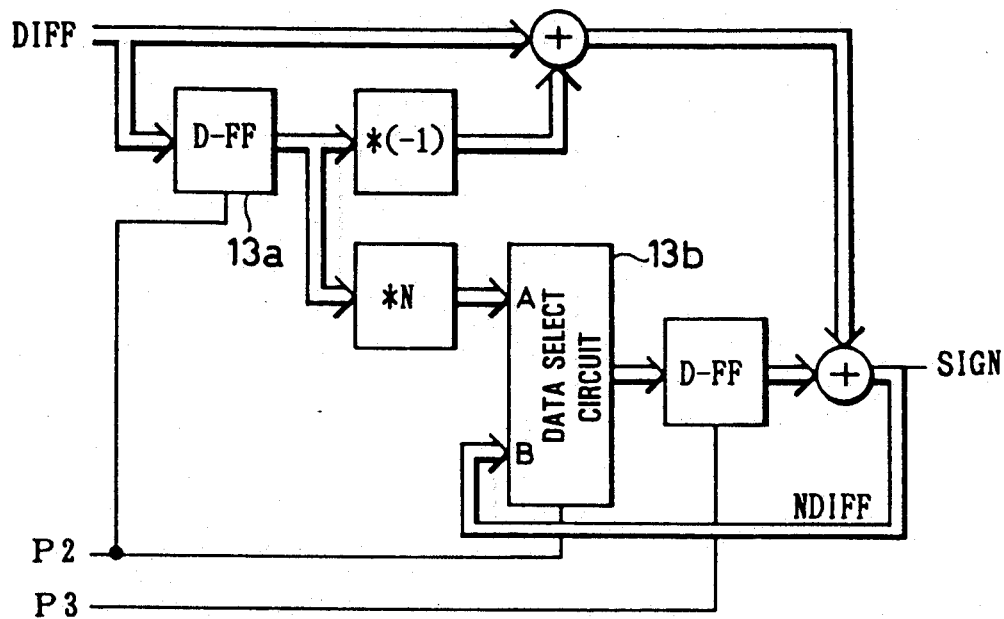
FIG. 4 is a circuit block diagram of the interpolating circuit used in Embodiment 1 to interpolate the output signal of the secondary difference computing circuit by digitally processing and linearly approximating the output signal.
Figure 6:
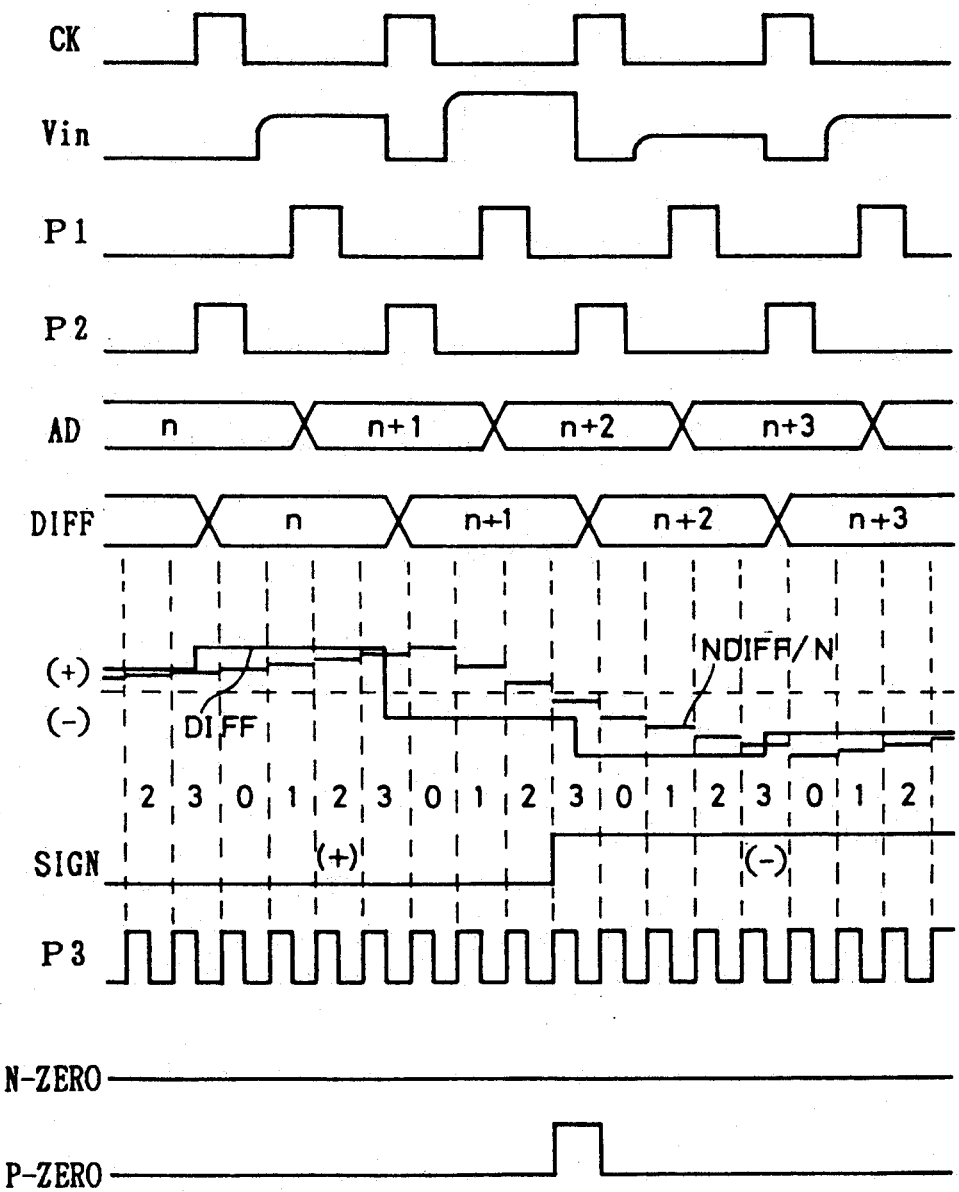
FIG. 6 is a voltage waveform time chart for the output signals of the line sensor, the A/D converter, the secondary difference computing circuit and the zero-cross detecting circuit, respectively.

Referring again to FIG. 1, a single A/D converter 9 is connected to an output terminal of the line sensor 8 and A/D converts the output signal of the line sensor 8 in synchronization with a clock pulse PI, as will be apparent from FIG. 6. A single secondary difference computing circuit 12 is connected to the output side of the A/D converter 9 and computes a secondary difference of the scene's luminance distribution representing signal which has been obtained by the line sensor 8. Referring to FIG. 3, the secondary difference computing circuit 12 successively stores output signals AD of the A/D converter 9 into memory circuits 12a, 12b utilizing a D flip-flop in synchronization with a clock pulse P2 and determines the secondary difference by computing $$DIFF(N) = AD(n-2) - 2*AD(n-1) + AD(n) \quad (8)$$

As will be apparent from FIG. 1, the output signal DIFF of the secondary difference computing circuit 12 is applied to a zero-cross detecting circuit 13 which functions to detect the zero-cross point of the secondary difference having been obtained by the secondary difference computing circuit 12. In the zero-cross detecting circuit 13, an interpolating circuit shown in detail in FIG. 4 interpolates the secondary difference signal DIFF. More specifically, this interpolating circuit initiates Its function by storing the secondary difference signal DIFF into a memory circuit 13a utilizing a D flip-flop, then multiplies the value thus stored by (−1) and N. The N-multiplied value is applied to a data selecting circuit 13b. The sum of the (−1) multiplied value and the secondary difference signal DIFF is added to the output data from the data selecting circuit 13b. The data obtained by this addition is fed back to the data selecting circuit 13b. In other words, the interpolating circuit interpolates the secondary difference signal DIFF by computing, in synchronization with a clock pulse P3, $$NDIFF(m) = N*DIFF(n-1) + m*(DIFF(n) - DIFF(n-1)) \quad (9)$$

and thereby linearly approximating the signal DIFF. Simultaneously with such interpolation, the interpolating circuit outputs a sign signal SIGN indicating whether the data has a positive sign or a negative sign.

Figure 5:
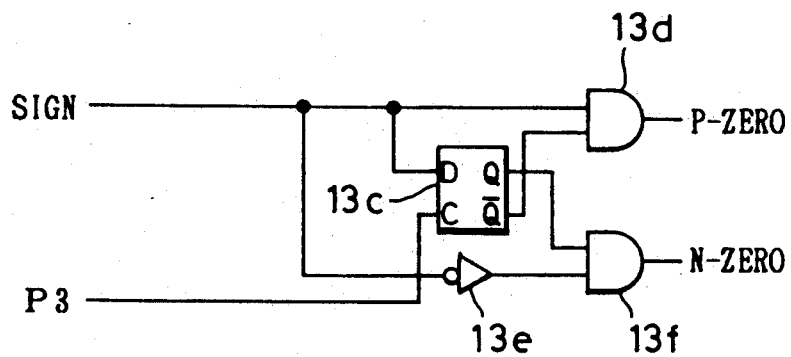
FIG. 5 is a schematic circuit diagram of the zero-cross detecting circuit used in Embodiment 1 to detect the zero-cross point in the interpolated data of the secondary difference signal, provided from the secondary difference computing circuit.

Referring to FIG. 5, the zero-cross detecting circuit 13 includes a D flip-flop 13c to which the sign output signal SIGN is applied. The Q terminal of the D flip-flop 13c is a lied together with the sign output SIGN to an AND gate 13d while the Q terminal of the D flip-flop 13c is applied together with sign output signal SIGN, inverted by an inverter 13e, to another AND gate 13f.

An output signal Vin from the line sensor 8 (FIG. 1) is applied to the A/D converter 9 in which the signal Vin is digitally converted to provide the output signal AD as illustrated by the time chart of FIG. 6. Upon application of this output signal AD to the secondary difference computing circuit 12, the secondary difference signal DIFF is generated in synchronization with the clock pulse P2 and, upon application of this signal DIFF to the zero-cross detecting circuit 13, the signal DIFF is linearly approximated to provide an Interpolated signal NDIFF/N and the sign signal SIGN& The zero-cross detecting circuit 13 is responsive to this sign signal SIGN so that, in synchronization with a clock pulse P3, the AND circuit 13d outputs the zero-cross signal in the form of a pulse P-ZERO which rises as the sign signal SIGN changes from L to H and the AND circuit 13f outputs the zero-cross signal in the form of a pulse N-ZERO which rises as the sign signal SIGN changes from H to L. In other words the pulse P-ZERO rises as the interpolated data NDIFF/N derived from the secondary difference signal DIFF zero-crosses from the positive side to the negative side and the pulse N-ZERO rises as the interpolated data NDIFF/N zero-crosses from the negative side to the positive side.

A zero-cross behavior signal obtained by the zero-cross detecting circuit 13 (FIG. 1) is divided into portions corresponding to the central line sensor section 10b, the right side line sensor section 20b and the left side line sensor section 30b, respectively, which are separately applied to and stored in zero-cross memory circuits 14, 24, 34, respectively. For the right and left side sections of the line sensor 8, the corresponding portions of the zero-cross behavior signal are stored at addresses provided from respective address computing circuits 25, 35 according to the pixel locations In the respective line sensor sections and, for the central section 10b of the line sensor 8, the corresponding portion of the zero-cross behavior is stored at an address according to a count signal (COUNTER 1) of a first counter 50. Specifically, the count signals (COUNTER 1) are applied from the first counter 50 to the address computing circuits 25, 35 as well as to the central memory circuit 14 for successive incrementing. The respective portions of the zero-cross behavior signal are stored at the respective addresses corresponding to the respective pixels in accordance with the following equations:

$$ADDRESS = COUNTER\ 1 \quad (10),$$

for the central memory circuit 14,

ADDRESS=COUNTER 1    (11)

for the right side memory circuit 24, and

ADDRESS=COUNTER 1    (12), for the left side memory circuit 34.

Count signals (COUNTER 2) are applied from a second counter 60 to the address computing circuits 25, 35. Count up and reset of the second counter 60 and the first counter 50 are under control of the output signal from the control circuit 40. The second counter 60 increments the address for every read-out of data from the zero-cross memory circuits 24, 34 as will be described later. The address computing circuits 25, 35 are supplied from the control circuit 40 with address processing information on the basis of which the address computing circuits 25, 35 provide predetermined write/read signals into and from the zero-cross memory circuits 25, 35.

The respective zero-cross memory circuits 14, 24, 34 are applied with interpolated location count signals (COUNTER 3) from an interpolated location counter 55 adapted to be counted up or reset depending on the output signal from the control circuit 40. As shown by FIG. 6, the interpolated location counter 55 operates in synchronization with the clock pulse P3 having a period shorter than both the clock pulse PI and the clock pulse P2 and additionally operates also in synchronization with the pulse P3 to divide the secondary difference signal DIFF into four portions having respective location codes 0 through 3 assigned thereto. According to the number of interpolations (4 in this case), the interpolated location count signals (COUNTER 3) are applied from the interpolated location counter 55 to the zero-cross memory circuits 14, 24, 34 and, in synchronization with the interpolated location count signals (COUNTER 3), location codes representing zero-crossing points detected by the zero-cross detecting circuit 13 are stored in the zero-cross memory circuits 14, 24, 34, for the above-mentioned respective location codes 0 through 3.

A coincidence detecting circuit 70 is connected to the output sides of the respective zero-cross memory circuits 14, 24, 34 so that the zero-cross behavior signals P-ZERO and N-ZERO as well as the zero-cross location codes both stored in the zero-cross memory circuits 14, 24, 34 are applied to the coincidence detecting circuit 70. The coincidence detecting circuit 70 determines whether these zero-cross behavior data coincide with the location codes or not. The control circuit 40 is also connected to the output side of this coincidence detecting circuit 70 so that the zero-cross data coincidence signal is applied to the control circuit 40 when the coincidence is detected.

The count signal from the first counter 50 is applied to an address port 81 of a data memory circuit 80, the count signal from the second counter 60 is applied to a range data port 82 of the data memory circuit 80, and the interpolated location count signal from the interpolated location counter 55 is applied to another range data port 83 of the data memory circuit 80. All of these count signals from the first counter 50, the second counter 60 and the interpolated location counter 55 are applied also to the control circuit 40. The control circuit 40 applies the data memory circuit 80 with data memory signals on the basis of which the address data and the range data are stored in the data memory circuit 80.

Figure 7:
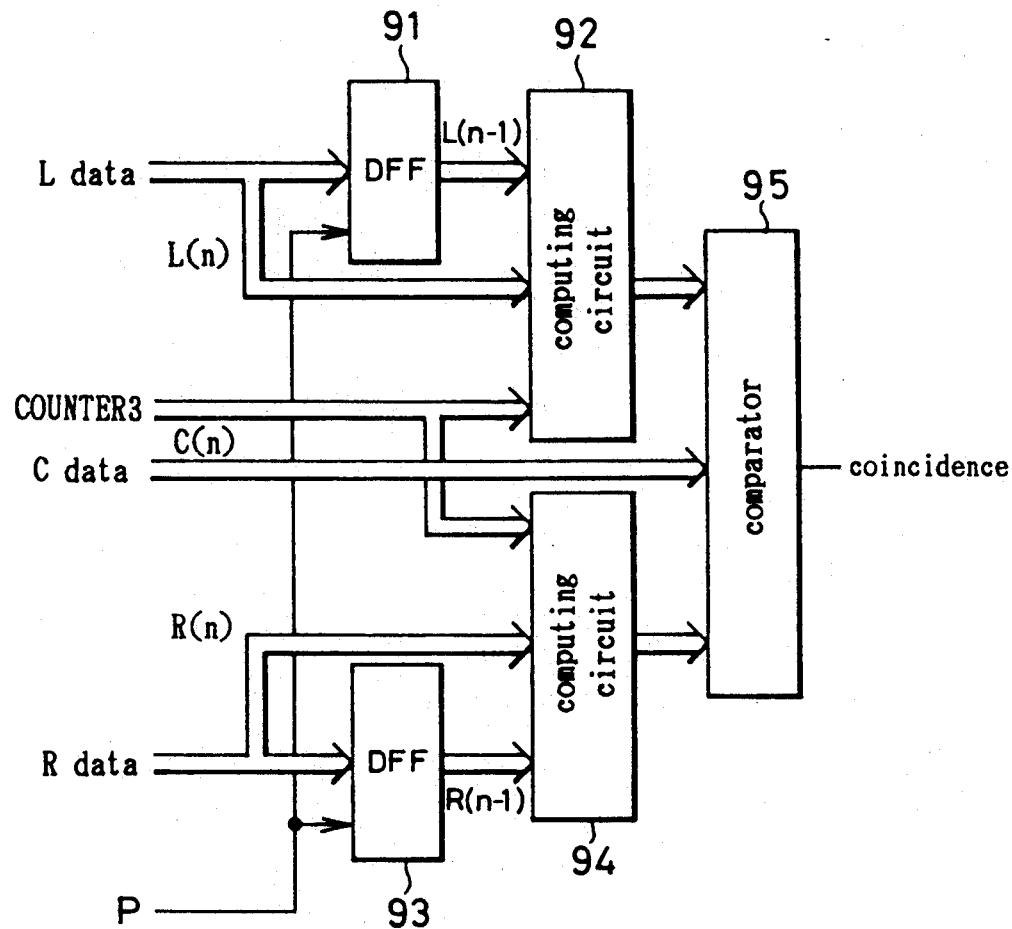
FIG. 7 is circuit block diagram of the coincidence detecting circuit for the zero-cross data.
Figure 8:
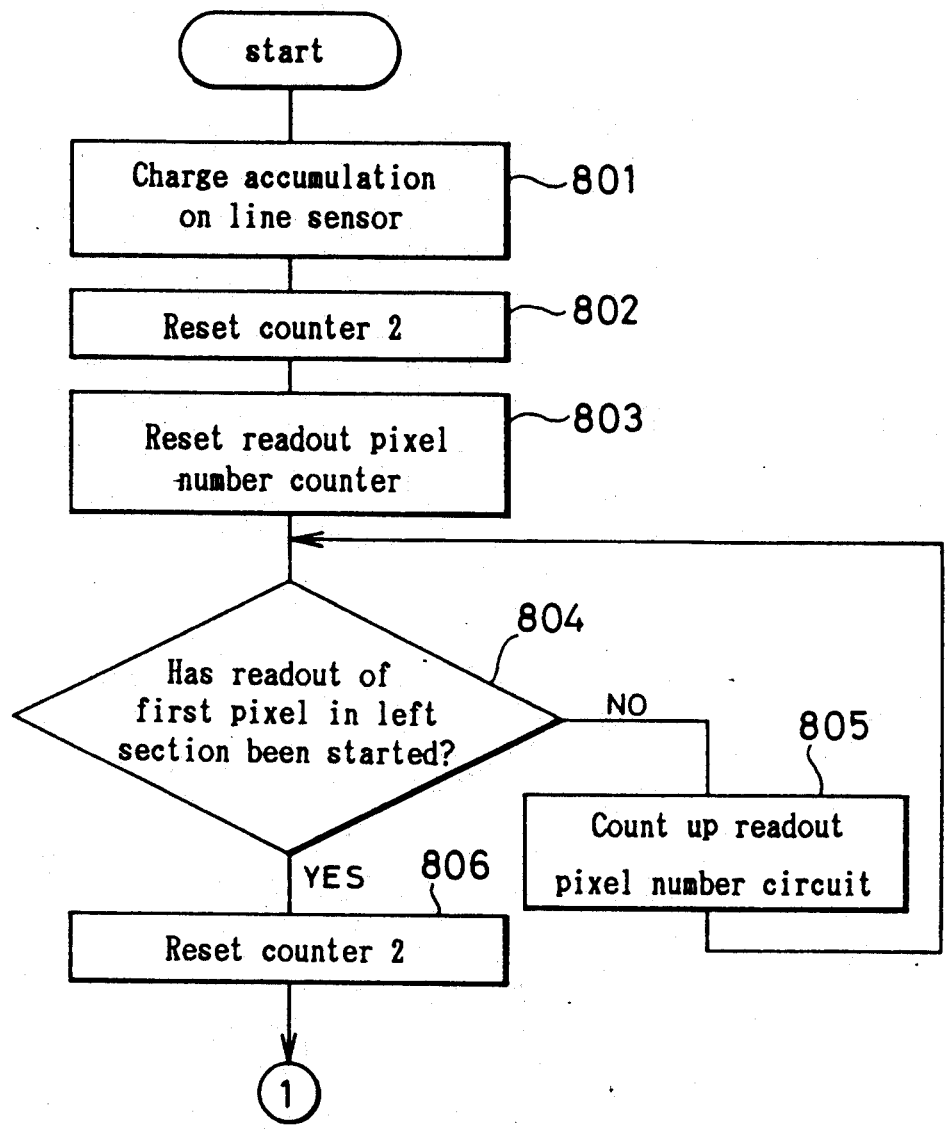
FIG. 8, FIG. 9, FIG. 10, FIG. 11, and FIG. 12 are flow chart of the program routine executed in Embodiment 1 to write the data obtained from the line sensor into the zero-cross memory circuit, particularly with respect to the left side section of the line sensor.
Figure 9:
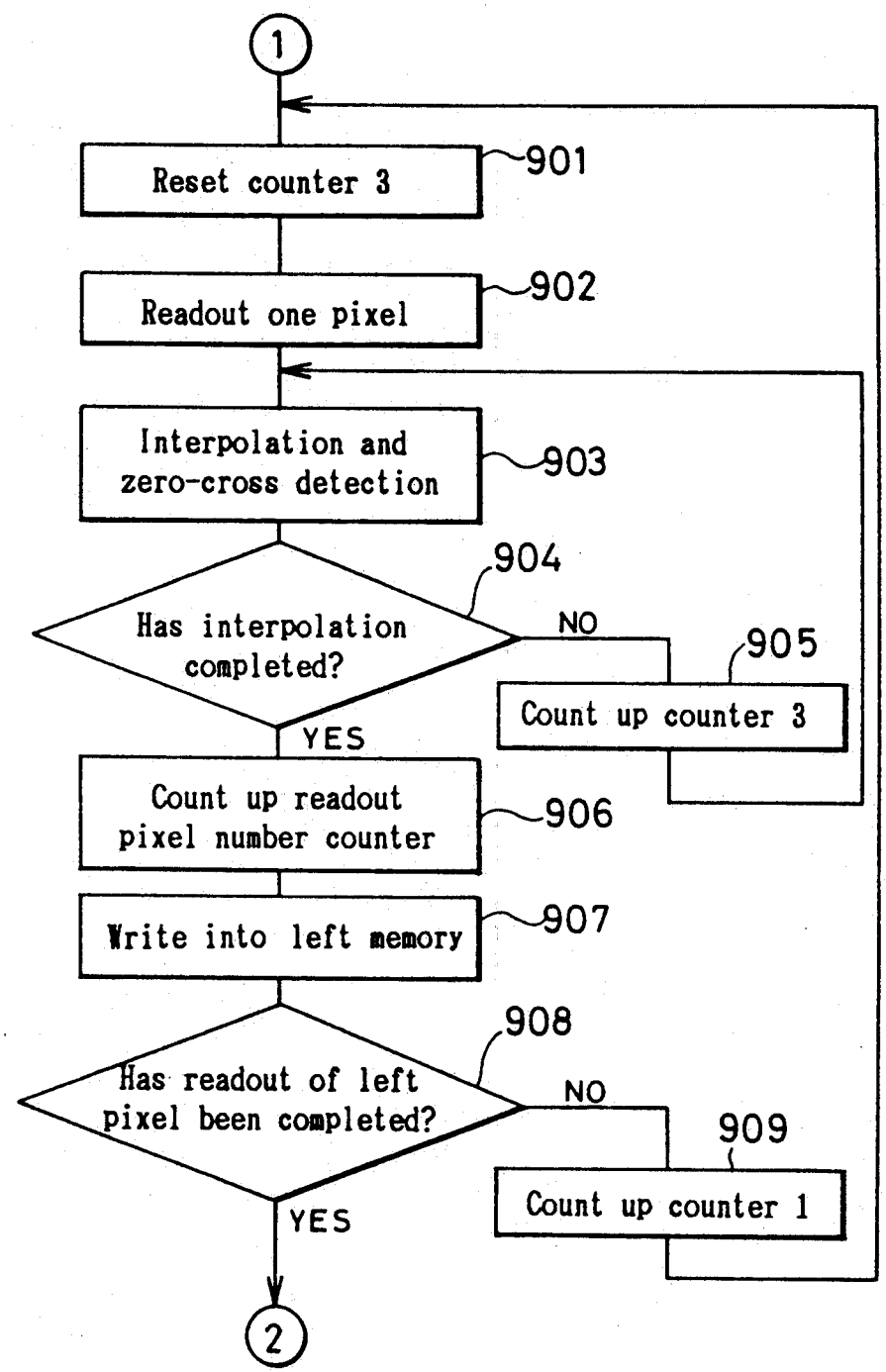
Figure 10:
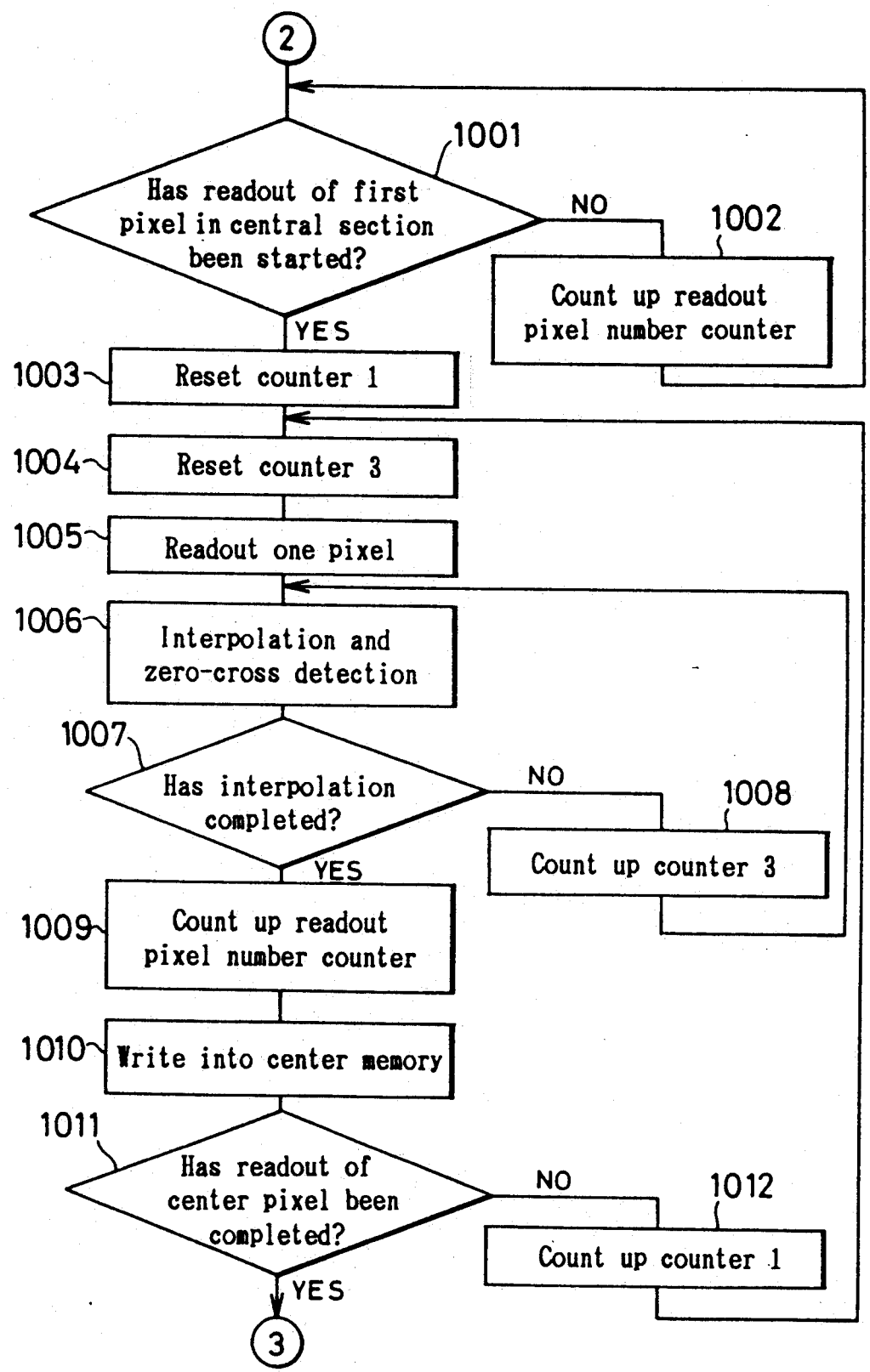
Figure 11:
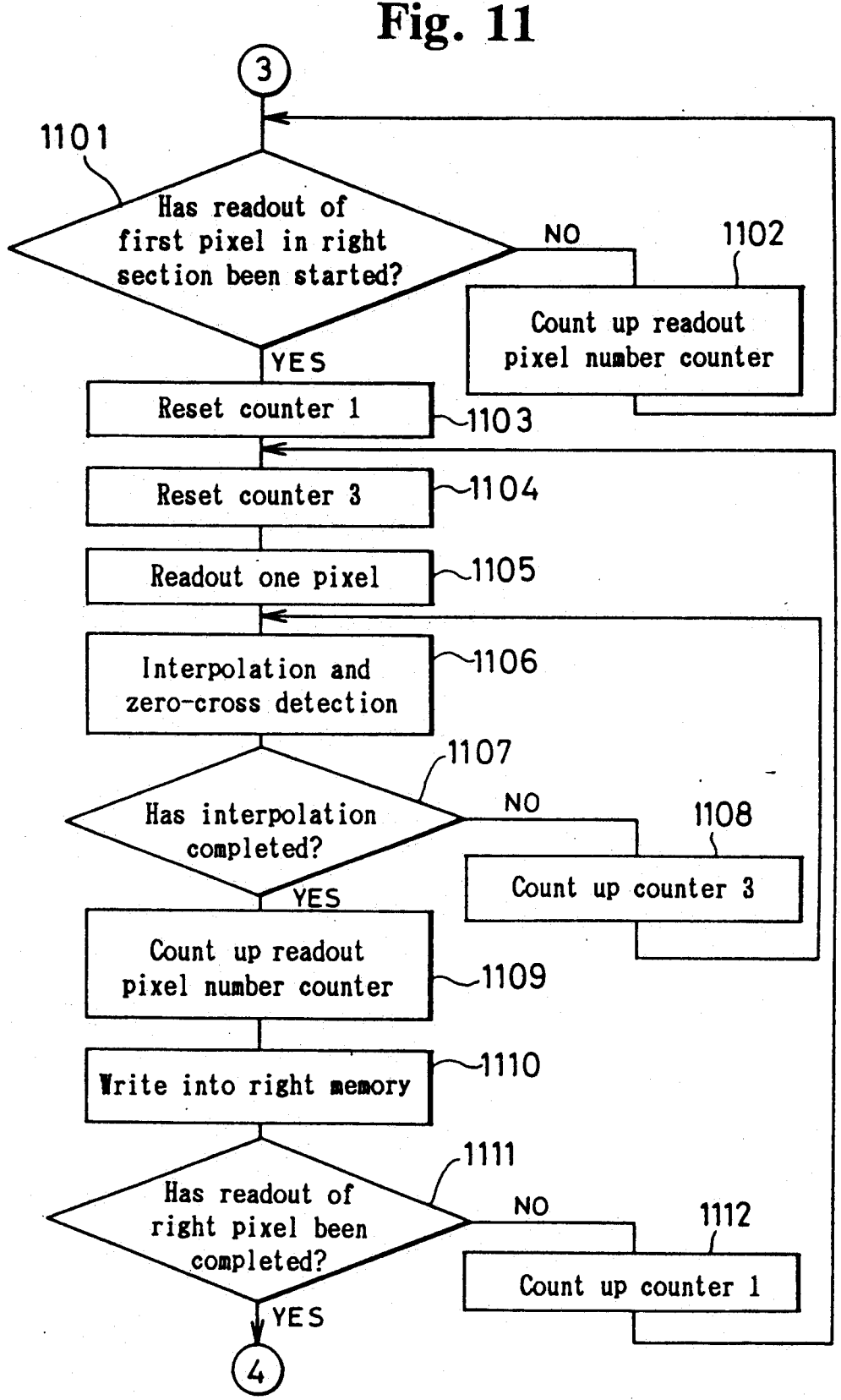

FIG. 7 is a block diagram concerning the coincidence detection occurring in the coincidence detecting circuit 70, in which the object luminance data provided from the central line sensor section 10b, the right side line sensor section 20b and the left side line sensor section 30b, and stored in the zero-cross memory circuits 14, 24, 34 are represented by C data, R data and L data, respectively. The L data is applied to a D flip-flop 91 and a computing circuit 92, the R data is applied to a D flip-flop 93 and a computing circuit 94. The data latched by the D flip-flop 91 is applied to the computing circuit 92 and the data latched by the D flip-flop 93 is applied to the computing circuit 94. The interpolated location signals (COUNTER 3) from the interpolated location counter 55 are also applied to the computing circuit 92 and the computing circuit 94, respectively. The output from the computing circuit 92, the output a comparator 95 which provides, in turn, the coincidence data when the comparator 95 determines a coincidence of these computing circuit outputs and the C data.

Referring to FIGS. 8 through 12, a program routine to write and read the luminance information for a scene to be photographed will be described. It should be understood that the first counter 50 and the second counter 60 operate in synchronization with the clock pulse P2 while the interpolated location counter 55 operates in synchronization with the clock pulse P3.

Upon start of range finding, charge accumulation occurs on the line sensor 8 (step 801), then the second counter 60 is reset (step 802) and a read-out pixel number counter (not shown) included in the control circuit 40 is reset (step 803).

It is determined from a count value of the read-out pixel number counter whether read-out of a first pixel in the left side line sensor section 30b of the single line sensor 8 has been started or not (step 804) and the pixels are output one by one (step 805) until data corresponding to the first pixel begins to be read out. When the data corresponding to the first pixel begins to be read out, the routine proceeds to a step 806 to reset the first counter 50.

The routine proceeds to a step 901 (See FIG. 9) to reset a counter 3 and then data corresponding to one pixel in the left side line sensor section 30b is read out (step 902). The routine proceeds to a step 903 to execute the interpolative computation according to the equation (9) and thereby to obtain an interpolation data NDIFF/N. Based on this interpolation data and the sign signal SIGN thereof, the zero-cross Is detected. It should be understood that the interpolative computation is executed on the basis of the interpolated location count signal provided from the interpolated location counter 55 being counted up and the interpolated location count value at the moment of zero-cross detection is stored (not shown). The routine then proceeds to a step 904 to determine from the count value of the interpolated location counter 55 whether the interpolation has been completed or not, i.e., whether or not the single pixel read out at the previous step 902 has been interpolated by dividing this pixel into a predetermined sections. If not completed, the routine proceeds to a step 905 to count up the interpolated location counter 55 and then returns to the step 903. Thus, step 903 and step 904 are repeated until the interpolation is completed. After the interpolation has been completed, the routine proceeds to a step 906.

The step 906 counts up the read-out pixel number counter and then the routine proceeds to a step 907 to write the interpolated location data corresponding to one pixel in the left side line sensor section 30b which was read out and interpolated (step 902) into the left side zero-cross memory circuit 34. The routine proceeds to a step 908 determine from the count value of the first counter 50 whether all the pixels contained in the left side line sensor section 30b have been read out or not and, If not, the routine proceeds to a step 909 to count up the first counter 50 and then returns to the step 901 from which the routine follows again the step 902 to read out one pixel, the step 903 to execute the interpolation and the zero-cross detection, and the step 907 to write the interpolated location data into the left side zero-cross memory circuit 34. The data written into the left side zero-cross memory circuit 34 is stored at the address assigned by the address computing circuit 35, based on the count signal provided from the first counter 50. The data to be stored comprise the zero-cross location data and the polarity data, and the address at which the data is to be stored is assigned according to the previously mentioned equation (12).

If read-out of all the pixels in the left side line sensor section 30b has been completed and thus conclusion of the step 908 is YES, the routine proceeds to a step 1001 (FIG. 10) to determine from the count value of the read-out pixel number counter whether read-out of the first pixel in the central line sensor section 10b has been started or not and the pixels are output one by one (step 1002) until read-out of the first pixel starts. If read-out of the first pixel has started, the first counter 50 is reset (step 1003) and then the steps similar to the steps 901 through 909 are repeated with respect to the central line sensor section 10b. Specifically, after the interpolated location counter 55 has been reset (step 1004), read-out of one pixel is executed (step 1005), completion of the interpolation is determined on the basis of the interpolated location count value (steps 1007, 1008) while the interpolation and the zero-cross detection are executed (step 1006), followed by counting up the read-out pixel number counter (step 1009) and writing the data associated with the one pixel having been read out into the central zero-cross memory circuit 14 (step 1010). It is determined from the count value of the first counter 50 whether all the pixels of the central line sensor section 10b have been read out (step 1011), with the first counter 50 being counted up (step 1012). The address at which the data is to be stored is assigned according to the previously mentioned equation (10).

If all the pixels in the central line sensor section 10b have been read out, and such that the conclusion of the step 1011 is YES, the routine proceeds to a step 1101 (FIG. 11) to determine from the count value of the read-out pixel number counter whether read-out of the first pixel in the right side line sensor section 20b has been started or not while the pixels are output one by one (step 1102). If read-out of the first pixel has been started, the first counter 50 is reset (step 1103). Then, the steps similar to those for the left side line sensor section 30b and the central line sensor section 10b are repeated for the right side line sensor section 20b. Specifically, after the interpolated location counter 55 has been reset (step 1104), read-out of one pixel is executed (step 1105), completion of the interpolation is determined on the basis of the interpolated location count value (step 1107, 1108) while the interpolation and the zero-cross detection are executed (step 1106), followed by counting up the read-out pixel number counter (step 1109) and writing the data associated with the one pixel having been read out into the right side zero-cross memory circuit 24 (step 1110). It is determined from the count value of the first counter 50 whether all the pixels of the right side line sensor section 20b have been read out (step 1111) with the first counter 50 being counted up (step 1112). The data written into the right side zero-cross memory circuit 24 Is stored at the address assigned by the address computing circuit 25 according to the previously mentioned equation (11), based on the count signal provided from the first counter 50.

If read-out of all the pixels in the line sensor 8 has been completed and thus conclusion of the step 1111 is YES, the routine proceeds to a step 1201 (FIG. 12) to reset the interpolated location counter 55 and then the first counter 50 is reset (step 1202). The data written on the previously mentioned steps 907, 1010 and 1110 into the zero-cross memory circuits 14, 24, 34, respectively, are read out therefrom (step 1203), and it is determined by the coincidence detecting circuit 70 whether the data read out from the central zero-cross memory circuit 14, the right side zero-cross memory circuit 24 and the left side zero-cross memory circuit 34 coincide with one another or not (step 1204).

Assuming that the number of interpolations is 4, the coincidence detecting circuit 70 will detect the coincidence of C data, R data and L data on the basis of the location data converted to $r(n)+4-$COUNTER 3 for location data, R(n)

$r(n-1)-$COUNTER 3 for location data, R(n−1)

$l(n)+$COUNTER 3 for location data, L(n), and $l(n-1)-4+$COUNTER 3 for location data, L(n−1)

and the corresponding polarity data, where R(n) and L(n) represent location data portions of R(n),and L(n), respectively. FIG. 13 illustrates the coincidence detecting operation executed by the circuit arrangement shown by FIG. 7. As illustrated, the coincidence detection is executed as the COUNTER 3 is incremented, with the data corresponding to one pixel of C data remaining fixed. It is assumed here that, for L data, the divided location codes of the location data L(n−1), L(n) and L(n+1) are arranged in the order of −4 through 7 starting from the uppermost bit and, for R data, the divided location codes of the location data R(n−2), R(n−1) and R(n) are arranged in the order of −4 through 7 starting from the uppermost bit. When the interpolated location count signal is zero (COUNTER 3=0), the location codes 0 through 3 of L data and the location codes 0 through 3 of R data are compared with the location codes 0 through 3 of C data. When the COUNTER 3 is counted up so as to establish COUNTER 3=1, the location codes 1 through 4 of L data and the location codes −1 through 2 of R data are converted to the location codes 0 through 3, respectively, to be compared with the location codes 0 through 3 of C data. When COUNTER 3=2, the location codes 2 through 5 of L data and the location codes −2 through 1 are converted to the location codes 0 through 3 to be compared with the location codes 0 through 3 of C data. When COUNTER 3=3, the location codes 3 through 6 of L data and the location codes −3 through 0 of R data are converted to the location codes 0 through 3 to be compared with the location codes 0 through 3 of C data.

If the data coincidence is determined, the routine proceeds to a step 1205 to write a current value of the count signal (COUNTER 1) provided from the first counter 50 as the address data, a current value of the count signal (COUNTER 2) provided from the second counter 60 as the higher bit of the range data, and a current value of the interpolation count signal (COUNTER 3) provided from the interpolated location counter 55 as the lower bit of the range data into the data memory circuit 80. If the conclusion of step 1204 is NO, the routine proceeds to a step 1206 to determine from a count value of the first counter whether read-out of the stored data (reference data) corresponding to all the effective pixels of the central line sensor section 10b has been completed or not and, if not, the routine proceeds to a step 1207 to count up the first counter 50. Then, the routine returns to the step 1203 to repeat the steps 1203 through 1206.

If read-out of the reference data is determined to have been completed, the routine proceeds from the step 1206 to a step 1208 to determine from a value of the interpolated location counter 55 whether the interpolation has been completed or not, i.e., whether the data coincidence has been detected in reference with the predetermined number of location codes. If the interpolation has not been completed, the routine proceeds to a step 1209 to count up the interpolated location counter 55 and then returns to the step 1202 to repeat steps 1202 through 1208. If the conclusion of the step 1208 is YES, the routine proceeds to a step 1210 to determine from a count value of the second counter 60 whether or not the data stored in the right side zero-cross memory circuit 24 and the left side zero-cross memory circuit 34 have been shifted by a given amount with respect to the data stored in the central zero-cross memory circuit 14 and the steps 1201 through 1208 have been executed (shift read-out). If the shift read-out has not been completed, the second counter 60 is counted up and the routine returns to the step 1201 and thus the steps 1202 through 1210 are repeated. Upon completion of the shift read-out, the routine proceeds to a step 1212.

Read-out of the stored data during these steps 1202 through 1211 is executed with the help of the first counter 50 and the address computing circuits 25, 35 which designate the respective addresses according to the following equation corresponding to the previously mentioned equations (10), (11) and (12), respectively: i.e., $$\text{ADDRESS} = \text{COUNTER 1} - 1 \quad (13)$$

for central zero-cross memory circuit 14, $$\text{ADDRESS} = \text{COUNTER 1} + \text{COUNTER 2} \quad (14)$$

for the right side zero-cross memory circuit 24, and $$\text{ADDRESS} = \text{COUNTER 1} + S - 1 - \text{COUNTER 2} \quad (15)$$

for the left side zero-cross memory circuit 34. In the equation (15), S represents a constant. A relationship established here between write-in address and read-out address will be explained with reference to FIGS. 14(a) and 14(b). No read-out occurs if the address is negative.

FIG. 14(a) illustrates the case in which the count signal from the second counter 60 is set to 0 (COUNTER 2=0). In such case, the data stored at the addresses corresponding to the respective pixels in the line sensor sections 10b, 20b, 30b are successively compared one to another with the first counter 50 being successively incremented from 0 to W (step 1207) to detect a coincidence of these data. Accordingly, if COUNTER 2=0, the address will be incremented from 0 to (W−1) for the pixels in the central line sensor section 10b, from 0 to W for the pixels in the right side line sensor section 20b and from (S−1) to (S+W−1) for the left side line sensor sensor section 30b. Thus, as will be apparent from FIG. 13, the pixels contained at a pair of adjacent addresses in each of the right side zero-cross memory circuit 24 and the left side zero-cross memory circuit 34 are successively shifted, in the order of the location codes corresponding to each address divided by the number of interpolations, relative to the pixel contained at a single address in the central zero-cross memory circuit 14 until a coincidence is detected.

Then, the second counter 60 is incremented (step 1211). With the count signal of the second counter 60 being set to 1 (COUNTER 2=1) as illustrated by FIG. 14(b), the data stored at the addresses corresponding to the pixels constituting the respective sections 10b, 20b, 30b of the line sensor 8 are compared one to another with the first counter 50 being incremented from 0 to W (step 1207) to detect their coincidence. Accordingly, at the state of COUNTER 2=1, the address is incremented from 0 to (W−1) for the central line sensor section 10b, from 1 to (W+1) for the right side line sensor section 20b and from (S−2) to (S+W−2) for the left side line sensor section 30b. In other words, the data contained in the location codes constituting a pair of adjacent addresses in each of the right side zero-cross memory circuit 24 and the left side zero-cross memory circuit 34 are successively shifted relative to the data contained in the location codes constituting a single address in the central zero-cross memory circuit 14 until a coincidence is detected.

Coincidence detection is repeated with the second counter 60 being incremented up to COUNTER 2=S−1 (step 1211).

More specifically, a value, containing the count value of the second counter 60 at the moment when the data stored in the respective zero-cross memory circuits 14, 24, 34 come In coincidence with one another as the higher bit and the count value of the Interpolated location counter 55 as the lower bit, corresponds to the amount of shift Xp in the previously mentioned equation (6). At the step 1205, this amount of shift is stored in the data memory circuit 80 as the range data.

If the step 1210 determines that read-out of the given shift has been completed, the routine proceeds to a step 1212 at which the range data having been written into the data memory circuit 80 at the step 1205 is applied to an objective driver (not shown) so that the objective may be moved so as to focus the camera on the scene to be photographed.

The data stored in the zero-cross memory circuits 14, 24, 34 to be used for the coincidence detection as has been mentioned above are respectively composed of the polarity data and the location data.

The data stored in the respective zero-cross memory circuits 14, 24, 34 for the coincidence detection as mentioned above comprise polarity data and location data. If the location data are stored at respective addresses, for example, corresponding to four divisions which constitute together each secondary difference signal DIFF, the memory capacity of 4 bits will be required for one polarity and an additional bit will be required for a pair of polarities, i.e., positive and negative polarities. In contrast, the requirement for the memory capacity can be met only with four bits when the zero-cross data are stored in the form of combined polarity/location data. More specifically, two bits are assigned for storage of the location code, one bit is assigned for indication of data's presence or absence and one bit is assigned for storage of the polarity data. In consequence, the invention can reduce the necessary memory capacity, on one hand, and shorten the processing time required for the coincidence detection, on the other hand.

Embodiment 2

Now Embodiment 2 will be described in reference with FIGS. 15 through 17.

According to Embodiment 2, photosensors 10, 20, 30 comprise line sensors 10b, 20b, 30b which comprise, in turn, photodetector array including an appropriate number of pixels arranged side by side, and imaging lenses combined with the respective line sensors. Referring to FIG. 16, there are provided on the front side of the photographic camera three imaging lenses 10a, 20a, 30a so that light rays emitted from a scene to be photographed pass through these imaging lenses 10a, 20a, 30a and the scene in imaged on the respective line sensors 10b, 20b, 30b placed behind them. These photosensors 10, 20, 30 are referred to hereinafter as the central sensor 10, the right side sensor 20 and the left side sensor 30 with optical axes 20c, 30c of the right side sensor 20 and the left side sensor 30, respectively, being arrange symmetrically with respect to an optical axis 10c of the central sensor 10. Those line sensors 10b, 20b, 30b are referred to hereinafter as the central line sensor 10b, the right side line sensor 20b and the left side line sensor 30b.

The line sensors 10b, 20b, 30b are separately applied, as illustrated by FIG. 15, with driver signals from respective sensor drivers 11, 21, 31 and begin to pick up the light rays coming from the scene on the basis of the driver signals. The sensor drivers 11, 21, 31 are connected to a control circuit 40 via a drive control signal link 40a and controlled by a drive control signal output from the control circuit 40.

As will be apparent from FIG. 15, A/D converters 16, 26, 36 are connected to output terminals of the line sensors 10b, 20b, 30b, respectively, for A/D conversion of output signals provided from the line sensors 10b, 20b, 30b. Secondary difference computing circuits 12, 22, 32 are connected to output terminals of the A/D converters 16, 26, 36, respectively, for computing secondary differences of signals representing the luminance distribution on the scene, which have been obtained by the respective line sensors 10b, 20b, 30b. These secondary difference computing circuits 12, 22, 32 are similar to those used in Embodiment I as has previously been described in reference with FIG. 3 and serve to compute the secondary differences according to the previously mentioned equation (8).

As illustrated in FIG. 15, output signals of the secondary difference computing circuits 12, 22, 32 are applied to zero-cross detecting circuits 13, 23, 33, respectively, which detect then zero-cross points of the secondary differences obtained by the associated secondary difference computing circuits 12, 22, 32. These zero-cross detecting circuits 13, 23, 33 are similar to those used in Embodiment 1 as has previously mentioned in reference with FIGS. 4 and 5, in which the Interpolating computation according to the above-mentioned equation (9) and detection of zero-cross data in the form of pulses P-ZERO, N-ZERO are performed.

Zero-cross behavior signals obtained by the respective zero-cross detecting circuits 13, 23, 33 are applied to the zero-cross memory circuits 14, 24, 34, respectively, and stored therein. These zero-cross behavior signals are then stored at addresses which are provided from respective address computing circuits 15, 25, 35 according to the pixel locations in the respective line sensors 10b, 20b, 30b. More specifically, the counter signals (COUNTER 1) are applied from the first counter 50 to the address computing circuits 15, 25, 35 for successive increment and the zero-cross behavior signals are stored at the respective addresses corresponding to the respective pixels in accordance with the following equations:

$$\text{ADDRESS} = \text{COUNTER 1} - \text{S} \quad (16)$$

for the central memory circuit 14, $$\text{ADDRESS} = \text{COUNTER 1} - \text{S} \quad (17)$$

for the right side memory circuit 24, and, $$\text{ADDRESS} = \text{COUNTER 1} \quad (18)$$

for the left side memory circuit 34. In the equations (16) and (17), S represents a constant.

Count signals (COUNTER 2) from the second counter 60 are applied to the respective address computing circuits 25, 35. Count up and reset of the second counter 60 as well as of the first counter 50 are under control of output signal from the control circuit 40. The second counter 60 increments the address for every read-out of data from the zero-cross memory circuits 24, 34. The address computing circuits 15, 25, 35 are also supplied from the control circuit 40 with the address processing information on the basis of which the address computing circuits 15, 25, 35 provide predetermined write/read signals for the zero-cross memory circuits 14, 24, 34.

As in the case of Embodiment 1, the respective zero-cross memory circuits 14, 24, 34 are applied with interpolated location count signals (COUNTER 3) from an interpolated location counter 55 adapted to be counted up or reset depending on the output signal from the control circuit 40. As shown by FIG. 6, this interpolated location counter 55 operates in synchronization with the clock pulse P3 having a period shorter than both the clock pulses P1, P2 so that the data may be written and read In subdivided form. The interpolated location counter 55 additionally operates also in synchronization with the pulse P3 to divide the secondary difference signal DIFF into four portions having respective location codes 0 through 3 assigned thereto. According to the number of interpolations (4 in this case), the interpolated location count signals (COUNTER 3) are applied from the interpolated location counter 55 to the respective zero-cross memory circuits 14, 24, 34 and, in synchronization with the interpolated location count signals, the location codes representing the zero-cross points detected by the respective zero-cross detecting circuits 13, 23, 33 are stored in the zero-cross memory circuits 14, 24, 34.

A coincidence detecting circuit 70 is connected to the output sides of the respective zero-cross memory circuits 14, 24, 34 so that the zero-cross behavior signals P-ZERO, N-ZERO as well as the zero-cross location codes both stored in the respective zero-cross memory circuits 14, 24, 34 are applied to this coincidence detecting circuit 70. It is determined by this coincidence detecting circuit 70 whether these zero-cross behavior data coincide with the location codes or not. The control circuit 40 is also connected to the output side of this coincidence detecting circuit 70 so that a zero-cross data coincidence signal is applied to the control circuit 40 when a coincidence is detected.

The count signal from the first counter 50 is applied to an address port 81 of a data memory circuit 80, the count signal from the second counter 60 is applied to a range data port 82 of the data memory circuit 80, and the interpolated location count signal from the interpolated location counter 55 is applied to another range data port 83 of the data memory circuit 80. All of these count signals from the first counter 50, the second counter 60 and the interpolated location counter 55 are applied also to the control circuit 40. The control circuit 40 supplies data memory circuit 80 with data memory signals on the basis of which the address data and the range data are stored in the data memory circuit 80.

Referring to FIG. 17, a routine to write and read the luminance information for a scene to be photographed will be described.

Upon start of range finding, charge accumulation occurs on the respective line sensors 10b, 20b, 30b (step 1701), then the second and first counters 60, 50 are reset (steps 1702, 1703, respectively), and the interpolated location counter 55 is reset (step 1704). The data corresponding to respective single pixels of the line sensors 10b, 20b, 30b are read out (step 1705) and, as in Embodiment 1, interpolation and zero-cross point detection are performed (step 1706). Then, it is determined from the count value of the interpolated location counter 55 whether interpolation has been completed or not (step 1707) and, if not, the interpolated location counter 55 is counted up (step 1708) and then the routine returns to the step 1706 in order to repeat the steps 1706 and 1707 until the interpolation is completed. Upon completion of the interpolation, the routine proceeds to step 1709 to write the read out data into the zero-cross memory circuits 14, 24, 34 (step 1709). The routine now proceeds to step 1710 to determine from the count value of the first counter 50 whether all the pixels have been read out or not and, if not, the routine proceeds to step 1711 to count up the first counter 50, and thereafter returns to the step 1704 to repeat reset of the interpolated location counter 55 (step 1704), read-out of single pixel (step 1705), interpolative computation and zero-cross detection (step 1706), determination whether the interpolation has been completed or not (step 1707) and writing into the zero-cross memory circuits 14, 24, 34 (step 1709). The data written into the zero-cross memory circuits 14, 24, 34 are stored at respective addresses assigned by the address computing circuits 15, 25, 35, respectively, on the basis of the count signals applied from the first counter 50 to these address computing circuits, according to the previously mentioned equations (16), (17) and (18). It should be understood that no write-in will occur if the address has a negative sign.

Figure 12:
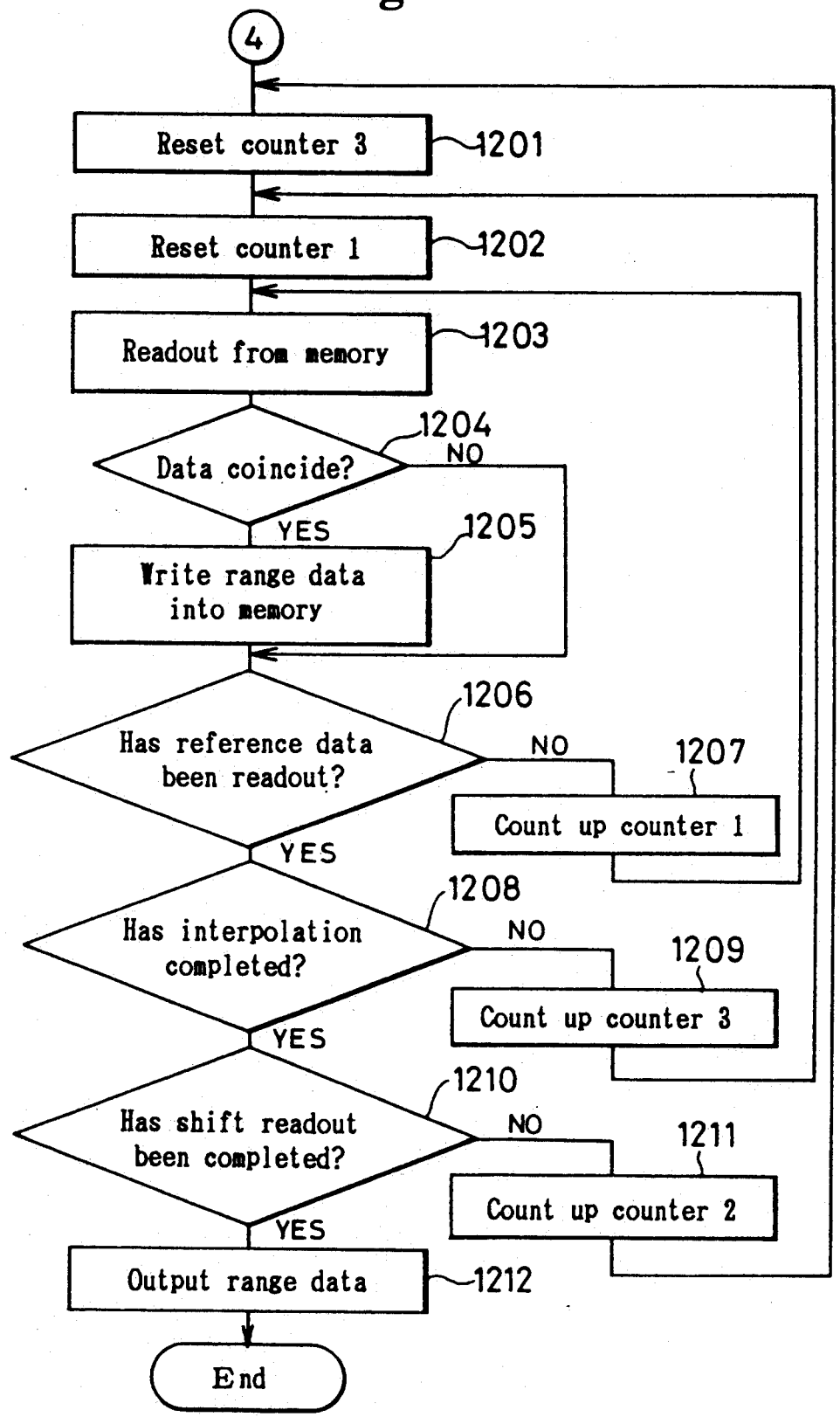

If all the pixels have been read out and thus the conclusion of the step 1710 is YES, the step 1201 through the step 1212 shown by FIG. 12 will be executed. Specifically, the data are read out from the zero-cross memory circuits 14, 24, 34 (step 1203) and it Is determined by the coincidence detecting circuit 70 whether the data read out from the central zero-cross memory circuit 14, the right side zero-cross memory circuit 24 and the left side zero-cross memory circuit 34 coincide with one another or not. It should be understood that, during the coincidence detection in the coincidence detecting circuit 70, the data conversion is performed In the same manner as has previously been mentioned. Upon completion of the shift read-out, the data memory circuit 80 provides the range finding data (step 1212).

For coincidence detection of the data stored in the respective zero-cross memory circuits 14, 24, 34, the data are read out from the addresses assigned by the address computing circuits 25, 35 in cooperation with the first counter 50 according to the following equations corresponding to the previously mentioned equations (16), (17) and (18), respectively: i.e., $$\text{ADDRESS} = \text{COUNTER } 1 - 1 \qquad (19)$$

for the central zero-cross memory circuit 14, $$\text{ADDRESS} = \text{COUNTER } 1 + \text{COUNTER } 2 \qquad (20)$$

for the right side zero-cross memory circuit 24, and $$\text{ADDRESS} = \text{COUNTER } 1 + S - 1 - \text{COUNTER } 2 \qquad (21)$$

for the left side zero-cross memory circuit 34. In the equation (21), S represents a constant. During this process, there is established between write-in address and read-out address a relationship similar to that established in the case of Embodiment 1 and the coincidence detection is carried out with the first counter 50 being incremented from 0 to W.

Effect of the Invention

As will be apparent from the foregoing description, the range finder for passive type autofocussing device of the Invention is so arranged that a luminance on a scene to be photographed Is picked up by three line sensors. Secondary differences are computed from the luminance data. Three zero-cross data characterized by zero-cross points of the respective secondary differences are stored. These three zero-cross data are compared with one another to detect a zero-cross coincidence of these three data, with one of these three zero-cross data being selected as a reference data and the other two zero-cross data being successively shifted relative to the reference data by one pixel at a time, respectively. A range to the scene is computed based on a total amount by which the zero-cross data associated with the other two line sensors have been shifted relative to the reference data until the coincidence is detected. Accordingly, even a dynamic scene to be photographed can be reliably picked up and the objective can be rapidly focused on this scene. Additionally, the Invention effectively simplifies the computation and correspondingly shortens the time required for the computation, compared to the conventional range finder primarily depending on the analog processing, by A/D converting the output signals of the line sensors and thereby digitally computing the secondary differences.

The invention further allows the range to be finely divided using the minimum number of pixels by interpolating the output signals of the secondary difference computing circuits.

Moreover, the invention allows the memory capacity to be reduced without any performance loss by storing the zero-cross data to be coincidence-detected in the form of interpolated location data and polarity data within each pixel.

In addition, the invention permits the range data to be obtained with a high precision, since the invention depends on comparison of the zero-cross data derived from the respective secondary differences but not on comparison of the luminance distribution patterns formed by the scene to be photographed on the respective line sensors.

What is claimed is:

1. A range finder for a passive type autofocusing device, the range finder comprising:

three photosensors consisting of a single line sensor divided into three sections and three imaging lenses associated with the respective line sensor sections to pick up a luminance distribution of a scene to be photographed;

a single secondary difference computing circuit coupled to said line sensor and adapted to convert an analog output signal from the line sensor into a digital value and to compute a secondary difference output signal from the digital value;

a single zero-cross detecting circuit coupled to said secondary difference computing circuit and adapted to interpolate said output signal from the secondary difference computing circuit and then to derive polarity data by distinctly detecting a positive-to-negative zero-cross point and a negative-to-positive zero-cross point of said output signal from said secondary difference computing circuit;

zero-cross memory circuits coupled to said zero-cross detective circuit and adapted to store, in association with those three photosensors, respectively interpolated zero-cross location data within a single pixel of the line sensor together with polarity data obtained on the basis of the zero-cross behavior signal output from the zero-cross detecting circuit; and a coincidence detecting circuit coupled to said zero-cross memory circuits and adapted to compare the zero-cross location data and the polarity data stored in the respective zero-cross memory circuits and to detect a coincidence thereof;

wherein one of said three photosensors is selected as a reference photosensor and the zero-cross behavior signals obtained from the other two photosensors are successively shifted relative to the zero-cross behavior signal obtained from said reference photosensor until a coincidence of these zero-cross behavior signals is detected by the coincidence detecting circuit and a range to the scene is computed from a total amount of such shifting.

2. A range finder for a passive type autofocusing device, the range finder comprising:

three photosensors consisting of three line sensors and three imaging lenses associated with the respective line sensors to pick up a luminance distribution of a scene to be photographed;

secondary difference computing circuits coupled to said photosensors and adapted to convert analog output signals from the respective line sensors to digital values and then to compute secondary differences of the respective digital values;

zero-cross detecting circuits coupled to said secondary difference computing circuits and adapted to interpolate output signals of the respective secondary difference computing circuits and to drive polarity data by distinctly detecting positive-to-negative zero-cross points and negative-to-positive zero-cross points of the respective output signals;

zero-cross memory circuits coupled to said zero-cross detecting circuits and adapted to store, in association with those three photosensors, respectively, interpolated zero-cross location data within single pixels of the respective line sensors together with polarity data obtained on the basis of zero-cross behavior signals output from the respective zero-cross behavior signals output from the respective zero-cross detecting circuits; and a coincidence detecting circuit adapted to compare zero-cross location data and the polarity data stored in the respective zero-cross memory circuits and the detect a coincidence thereof;

wherein one of said three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed from a total amount of such shifting.

3. A range finder for a passive type autofocusing device as recited in claim 1, wherein the output signal DIFF from each secondary difference computing circuit is interpolated by linearly approximating NDIFF according to:

$$NDIFF(m) = N^*DIFF(n-1) + m^*(DIFF(n) - DIFF(n-1))$$

where N represents a constant.

4. A range finder for a passive type autofocusing device as recited in claim 2, wherein the output signal DIFF from each secondary difference computing circuit is interpolated by linearly approximating NDIFF according to:

$$NDIFF(m) = N^*DIFF(n-1) + m^*(DIFF(n) - DIFF(n-1))$$

where N represents a constant.

* * * * *

UNITED STATES PATENT AND TRADEMARK OFFICE
CERTIFICATE OF CORRECTION

PATENT NO. : 5,264,891
DATED : November 23, 1993
INVENTOR(S) : Minoru Ishiguro

It is certified that error appears in the above-indentified patent and that said Letters Patent is hereby corrected as shown below:

Title page, item [57],
In the Abstract, line 3;
"section" should be -- sections --;

Column 1, line 15;
"07/959,665" should be -- 07/958,665 --;

Column 1, line 18;
"07/961,554" should be -- 07/961,544 --;

Column 1, line 27;
"scene a" should be -- scene and --;

Column 2, line 4;
"x," should be -- $x_1$ --;

Column 2, line 67;
After "these" insert -- three --;

Column 3, line 22;
"photographed a" should be -- photographed. A --;

Column 3, line 26;
"value a" should be -- value. A --;

Column 3, line 30;
"Zero-cross" should be -- zero-cross --;

Column 3, line 31;
"signal, zero-cross" should be -- signal. Zero-cross --;

Column 3, line 36;
"circuit a" should be -- circuit. A --;

UNITED STATES PATENT AND TRADEMARK OFFICE
CERTIFICATE OF CORRECTION

Page 2 of 5

PATENT NO. : 5,264,891
DATED : November 23, 1993
INVENTOR(S) : Minoru Ishiguro

It is certified that error appears in the above-indentified patent and that said Letters Patent is hereby corrected as shown below:

Column 3, line 40;
"thereof, one" should be -- thereof. One --;

Column 3, line 54;
"computing circuit" should be -- computing circuits --;

Column 3, line 64;
"associated" should be -- association --;

Column 4, line 38;
After "is" insert -- a --;

Column 4, line 40;
After "are" insert -- a --;

Column 4, line 49;
Before (a) insert -- Fig. 14 --;

Column 5, line 35;
"PI" should be -- P1 --;

Column 5, line 59;
"Its" should be -- its --;

Column 6, line 14;
"a lied" should be -- applied --;

Column 6, line 18;
After "Vin" insert -- (Fig. 6) --;

Column 6, lines 27 and 28;
"Interpolated" should be -- interpolated --;

UNITED STATES PATENT AND TRADEMARK OFFICE
CERTIFICATE OF CORRECTION

PATENT NO. : 5,264,891
DATED : November 23, 1993
INVENTOR(S) : Minoru Ishiguro

It is certified that error appears in the above-indentified patent and that said Letters Patent is hereby corrected as shown below:

Column 6, line 28;
    "SIGN&" should be -- SIGN. --;

Column 6, line 52;
    "In" should be -- in --;

Column 7, line 27;
    "PI" should be -- P1 --;

Column 8, line 17;
    After "the output" insert -- from the computing circuit 94 and the C data are applied to --;

Column 8, line 49;
    "Is" should be -- is --;

Column 9, line 8;
    "If" should be -- if --;

Column 10, line 7;
    "Is" should be -- is --;

Column 10, line 37;
    "R(n)" should be -- r(n) --;

Column 10, line 38;
    "L(n)" should be -- l(n) --;

Column 12, line 43;
    "In" should be -- in --;

Column 12, line 44;
    "Interpolated" should be -- interpolated --;

UNITED STATES PATENT AND TRADEMARK OFFICE
CERTIFICATE OF CORRECTION

PATENT NO. : 5,264,891
DATED : November 23, 1993
INVENTOR(S) : Minoru Ishiguro

It is certified that error appears in the above-indentified patent and that said Letters Patent is hereby corrected as shown below:

Column 13, line 55;
    "Embodiment I" should be -- Embodiment 1 --;

Column 13, line 68;
    "Interpolating" should be -- interpolating --;

Column 14, line 52;
    "In" should be -- in --;

Column 15, line 21;
    After "supplies" insert -- the --;

Column 15, line 67;
    "Is" should be -- is --;

Column 16, line 6;
    "In" should be -- in --;

Column 16, line 37;
    "Invention" should be -- invention --;

Column 16, line 38;
    "Is" should be -- is --;

Column 16, lines 54 and 55;
    "Invention" should be -- invention --;

Column 18, line 24;
    After "compare" insert -- the --;

Column 18, line 27;
    "and the" should be -- and to --;

UNITED STATES PATENT AND TRADEMARK OFFICE
CERTIFICATE OF CORRECTION

PATENT NO. : 5,264,891
DATED : November 23, 1993
INVENTOR(S) : Minoru Ishiguro

It is certified that error appears in the above-indentified patent and that said Letters Patent is hereby corrected as shown below:

Column 18, line 43;
"(n-1)" should be -- (n-1)) --.

Signed and Sealed this

Ninth Day of May, 1995

Attest:

BRUCE LEHMAN

Attesting Officer    Commissioner of Patents and Trademarks